(12) United States Patent
Suneja et al.

(10) Patent No.: US 11,947,940 B2
(45) Date of Patent: Apr. 2, 2024

(54) TRAINING DATA AUGMENTATION VIA PROGRAM SIMPLIFICATION

(71) Applicant: International Business Machines Corporation, Armonk, NY (US)

(72) Inventors: Sahil Suneja, Ossining, NY (US); Yufan Zhuang, New York, NY (US); Yunhui Zheng, Chappaqua, NY (US); Alessandro Morari, New York, NY (US); Jim Alain Laredo, Katonah, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 178 days.

(21) Appl. No.: 17/498,463

(22) Filed: Oct. 11, 2021

(65) Prior Publication Data

US 2023/0113733 A1 Apr. 13, 2023

(51) Int. Cl.
*G06F 8/40* (2018.01)
*G06F 8/41* (2018.01)
(Continued)

(52) U.S. Cl.
CPC ........ *G06F 8/4435* (2013.01); *G06F 18/2155* (2023.01); *G06F 18/217* (2023.01); *G06N 20/00* (2019.01)

(58) Field of Classification Search
CPC ...................................................... G06F 8/40
See application file for complete search history.

(56) References Cited

U.S. PATENT DOCUMENTS 11,507,655 B1\* 11/2022 Ketireddy ................. G06F 8/70
2012/0047581 A1\* 2/2012 Banerjee ............... G06F 21/554
726/23
(Continued)

FOREIGN PATENT DOCUMENTS

CN 109902820 A 6/2019
CN 110750298 A 2/2020
(Continued)

OTHER PUBLICATIONS

Office Action received for Taiwanese Patent Application Serial No. 11220389730 dated Apr. 27, 2023, 8 pages (Orignal copy only).
(Continued)

*Primary Examiner* — Jae U Jeon
(74) *Attorney, Agent, or Firm* — Amin, Turocy & Watson, LLP

(57) ABSTRACT

Techniques regarding augmenting one or more training datasets for training one or more AI models are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise training augmentation component that can generate an augmented training dataset for training an artificial intelligence model by extracting a simplified source code sample from a source code sample comprised within a training dataset.

25 Claims, 12 Drawing Sheets

(51) Int. Cl.
G06F 18/21 (2023.01)
G06F 18/214 (2023.01)
G06N 20/00 (2019.01)

(56) References Cited

U.S. PATENT DOCUMENTS

| | | | |
|---|---|---|---|
| 2013/0124713 A1* | 5/2013 | Feinberg | G06F 11/3086 709/224 |
| 2015/0088286 A1* | 3/2015 | Ruth | G05B 19/0426 700/86 |
| 2017/0213154 A1 | 7/2017 | Hammond et al. | |
| 2018/0150742 A1* | 5/2018 | Woulfe | G06F 11/3608 |
| 2018/0357047 A1 | 12/2018 | Brown et al. | |
| 2018/0357543 A1 | 12/2018 | Brown et al. | |
| 2019/0130218 A1* | 5/2019 | Albright | G06V 10/772 |
| 2021/0141718 A1* | 5/2021 | Sandhu | G06F 8/60 |
| 2021/0166085 A1 | 6/2021 | Schlicht et al. | |
| 2021/0303271 A1* | 9/2021 | Hicklin | G06F 8/33 |
| 2023/0014615 A1* | 1/2023 | Wang | G06F 11/362 |

FOREIGN PATENT DOCUMENTS

| | | |
|---|---|---|
| CN | 112990423 A | 6/2021 |
| CN | 113408562 A | 9/2021 |
| EP | 1291775 A1 | 3/2003 |
| TW | 202122993 A | 6/2021 |
| WO | 03023615 A2 | 3/2003 |
| WO | 2021047975 A1 | 3/2021 |

OTHER PUBLICATIONS

Puri, et al., "Project CodeNet: A Large-Scale AI for Code Dataset for Learning a Diversity of Coding Tasks," arXiv preprint arXiv:2105.12655 2021, 21 pages.
Brown, et al., "Language Models are Few-Shot Learners," arXiv:2005.14165v4 [cs.CL] Jul. 22, 2020, 75 pages.
Shorten, et al., "A survey on Image Data Augmentation for Deep Learning," Big Data (2019) 6:60, https://doi.org/10.1186/s40537-019-0197-0, 48 pages.
Madry, et al., "Towards Deep Learning Models Resistant to Adversarial Attacks," Published as a conference paper at ICLR 2018, 23 pages.
Yu, et al., "SeqGAN: Sequence Generative Adversarial Nets with Policy Gradient," arXiv:1609.05473v6 [cs.LG] Aug. 25, 2017, 11 pages.
Mell et al., The NIST Definition of Cloud Computing, Recommendations of the National Institute of Standards and Technology, NIST Special Publication 800-145, Sep. 2011, 7 pages.
"Juliet Test Suite for C/C++ Version 1.3", URL: https://doi.org/10.6028/NIST.TN.1995, NIST, 2017, 36 pages.
Panthaplackel et al., "Learning to Update Natural Language Comments Based on Code Changes", Proceedings of the 58th Annual Meeting of the Association for Computational Linguistics, Jul. 5-10, 2020, 16 pages.
Pascarella et al., "On the performance of method-level bug prediction: A negative result", The Journal of Systems & Software, vol. 161, 2020, 22 pages.
Patra et al., "Semantic Bug Seeding: A Learning Based Approach for Creating Realistic Bugs", ESEC/FSE, Association for Computing Machinery, Aug. 23-28, 2021, pp. 906-918.
Pradel et al., "DeepBugs: A Learning Approach to Name-Based Bug Detection", Proceedings of the ACM on Programming Languages, 2(OOPSLA), Article 147, Nov. 2018, pp. 1-25.
Rabin et al., "Understanding Neural Code Intelligence through Program Simplification", Proceedings of the 29th ACM Joint Meeting on European Software Engineering Conference and Symposium on the Foundations of Software Engineering , ESEC/FSE, Aug. 23-28, 2021, 12 pages.
Ribeiro et al., ""Why should I trust you?" Explaining the Predictions of any Classifier", Proceedings of the 22nd ACM SIGKDD International Conference on Knowledge Discovery and Data Mining, 2016, 10 pages.
Roy et al., "Bug Synthesis: Challenging Bug-Finding Tools with Deep Faults", Proceedings of the 26th ACM Joint Meeting on European Software Engineering Conference and Symposium on the Foundations of Software Engineering , ESEC/FSE, Nov. 4-9, 2018, pp. 224-234.
Russell et al., "Automated Vulnerability Detection in Source Code Using Deep Representation Learning", 17th IEEE International Conference on Machine Learning and Applications, 2018, 7 pages.
Selvaraju et al., "Grad-Cam: Visual Explanations from Deep Networks via Gradient-Based Localization", Proceedings of the IEEE international conference on computer vision, 2017, 24 pages.
Sestili et al., "Towards security defect prediction with AI", URL: https://arxiv.org/pdf/1808.09897.pdf, 2018, 11 pages.
Shorten et al., "A survey on image data augmentation for deep learning", Journal of Big Data, vol. 6, No. 60, 2019, pp. 1-48.
Shrikumar et al., "Learning Important Features Through Propagating Activation Differences", Proceedings of the 34th International Conference on Machine Learning, 2017, 9 pages.
Sundararajan et al., "Axiomatic Attribution for Deep Networks", Proceedings of the 34th International Conference on Machine Learning, 2017, 11 pages.
Suneja et al., "Learning to map source code to software vulnerability using code-as-a-graph", URL: https://arxiv.org/ftp/arxiv/papers/2006/2006.08614.pdf, 2020, pp. 1-8.
Suneja et al., "Probing Model Signal-Awareness via Prediction-Preserving Input Minimization", Proceedings of the 29th ACM Joint Meeting on European Software Engineering Conference and Symposium on the Foundations of Software Engineering, ESEC/FSE, 2021, pp. 945-955.
McKay, Peter, "Accelerating our developer-first vision with DeepCode", URL: https://snyk.io/blog/accelerating-developer-first-vision-with-deepcode/, Snyk Team, Sep. 23, 2020, pp. 1-5.
Tufano et al., "On Learning Meaningful Code Changes via Neural Machine Translation", Proceedings of the 41st International Conference on Software Engineering, IEEE/ACM, May 25-31, 2019, pp. 25-36.
Tufano et al., "An Empirical Study on Learning Bug-Fixing Patches in the Wild via Neural Machine Translation", ACM Transactions on Software Engineering and Methodology, vol. 28, No. 4, Article 19, Sep. 2019, pp. 1-29.
Tufano et al., "Learning How to Mutate Source Code from Bug-Fixes", International Conference on Software Maintenance and Evolution, IEEE, Sep. 29-Oct. 4, 2019, 12 pages.
Veličković et al., "Graph Attention Networks", International Conference on Learning Representations, 2018, pp. 1-12.
Xie et al., "Crystal Graph Convolutional Neural Networks for an Accurate and Interpretable Prediction of Material Properties", Physical Review Letters, vol. 120, No. 14, 2018, pp. 1-9.
Yamaguchi et al., "Modeling and Discovering Vulnerabilities with Code Property Graphs", IEEE Symposium on Security and Privacy, 2014, 15 pages.
Yang et al., "A Survey on Deep Learning for Software Engineering", ACM Comput. Surv., vol. 1, No. 1, Article 1, Jan. 2020, pp. 1-35.
Ying et al., "GNNExplainer: Generating Explanations for Graph Neural Networks", 33rd Conference on Neural Information Processing Systems, 2019, pp. 1-13.
Yu et al., "Seqgan: Sequence Generative Adversarial Nets with Policy Gradient", Proceedings of the AAAI Conference on Artificial Intelligence, vol. 31, 2017, 11 pages.
Zeller, Andreas, "Isolating Cause-Effect Chains from Computer Programs", Proceedings of the 10th ACM SIGSOFT Symposium on Foundations of Software Engineering, SIGSOFT '02/FSE-10, Nov. 18-22, 2002, pp. 1-10.
Zeller et al., "Simplifying and Isolating Failure Inducing Input", IEEE Transactions on Software Engineering, vol. 28, No. 2, Feb. 2002, pp. 1-17.
Zhang et al., "Towards Stable and Efficient Training of Verifiably Robust Neural Networks", International Conference on Learning Representations, 2019, pp. 1-25.

(56) References Cited

OTHER PUBLICATIONS

Zhao et al., "On the Impact of Sample Duplication in Machine Learning-Based Android Malware Detection", ACM Transactions on Software Engineering and Methodology, vol. 30, No. 3, Article 40, May 2021, pp. 1-38.
Zheng et al., "D2A: A Dataset Built for AI-Based Vulnerability Detection Methods Using Differential Analysis", Proceedings of the ACM/IEEE 43rd International Conference on Software Engineering: Software Engineering in Practice, 2021, 10 pages.
Madry, et al., "Towards Deep Learning Models Resistant to Adversarial Attacks," 2018 In International Conference on Learning Representation, 2018.
Snyk Team. Accelerating our developer-first vision with DeepCode. https://snyk.io/blog/accelerating-developer-first-vision-with-deepcode/. Sep. 23, 2020.
Zhou, et al., Devign: Effective Vulnerability Identification by Learning Comprehensive Program Semantics via Graph Neural Networks. In Advances in Neural Information Process, arXiv:1909.03496v1 [cs.SE] Sep. 8, 2019.
International Search Report and Written Opinion for International Application No. PCT/IB2022/058950 dated Dec. 16, 2022.
Github, "Risk Assessment of GitHub Copilot", URL: https://gist.github.com/0xabad1dea/be18e11beb2e12433d93475d72016902, 0xabad1dea, Jul. 2021, pp. 1-21.
Adebayo et al., "Sanity checks for saliency maps", Proceedings of the 32nd International Conference on Neural Information Processing Systems, 2018, 30 pages.
Ahluwalia et al., "Snoring: a noise in defect prediction datasets", Proceedings of the 16th International Conference on Mining Software Repositories, 2019, pp. 63-67.
Allamania et al., "Suggesting Accurate Method and Class Names", Proceedings of the 10th Joint Meeting on Foundations of Software Engineering, Aug. 30-Sep. 4, 2015, pp. 38-49.
Allamanis et al., "Learning to Represent Programs with Graphs", ICLR, 2018, pp. 1-17.
Allamanis et al., "A Convolutional Attention Network for Extreme Summarization of Source Code", ICML, vol. 48, 2016, 11 pages.
Bader et al., "AI in Software Engineering at Facebook", IEEE Software, vol. 38, No. 4, Jul.-Aug. 2021, pp. 52-61.
Bangash et al., "On the time-based conclusion stability of cross-project defect prediction models", Empirical Software Engineering, vol. 25, No. 6, Sep. 9, 2020, 38 pages.
Bavishi et al., "Context2Name: A Deep Learning-Based Approach to Infer Natural Variable Names from Usage Contexts", URL: https://arxiv.org/pdf/1809.05193.pdf, Aug. 31, 2018, pp. 1-13.
Zhou et al., "Learning Deep Features for Discriminative Localization", IEEE Conference on Computer Vision and Pattern Recognition (CVPR), 2016, pp. 1-10.
Bennaceur et al., "Machine Learning for Software Analysis: Models, Methods, and Applications", Lecture Notes in Computer Science, vol. 11026, 2018, pp. 3-49.
Bielik et al., "Adversarial Robustness for Code", Proceedings of the 37th International Conference on Machine Learning, ICML, Virtual Event (Proceedings of Machine Learning Research, vol. 119), Jul. 13-18, 2020, 18 pages.
Brown et al., "The Care and Feeding of Wild-Caught Mutants", Proceedings of the 11th Joint Meeting on Foundations of Software Engineering, Sep. 4-8, 2017, 511-522.
Brown et al., "Language models are few-shot learners", URL: https://arxiv.org/pdf/2005.14165.pdf, 2020, pp. 1-75.
Chakraborty et al., "Bias in Machine Learning Software: Why? How? What to do?", 29th ACM Joint European Software Engineering Conference and Symposium on the Foundations of Software Engineering, ACM, Aug. 23-28, 2021, 12 pages.
Chawla et al., "SMOTE: Synthetic Minority Over-sampling Technique", Journal of Artificial Intelligence Research, vol. 16, Jun. 2002, pp. 321-357.
Ciniselli et al., "An Empirical Study on the Usage of BERT Models for Code Completion", 18th IEEE/ACM International Conference on Mining Software Repositories, MSR, May 17-19, 2021, 12 pages.
Cuoq et al., "Frama-C", International Conference on Software Engineering and Formal Methods, Springer, Oct. 2012, 16 pages.
Dam et al., "Automatic Feature Learning for Predicting Vulnerable Software Components", IEEE Transactions on Software Engineering, vol. 14, No. 8, Aug. 2015, pp. 1-19.
Dinella et al., "Hoppity: Learning graph transformations to detect and fix bugs in programs", International Conference on Learning Representations (ICLR), 2020, pp. 1-17.
Dolan-Gavitt et al., "LAVA: Large-Scale Automated Vulnerability Addition", IEEE Symposium on Security and Privacy (SP), 2016, pp. 110-121.
"Infer Static Analyzer", URL: https://fbinfer.com/, Facebook, retrieved on Oct. 28, 2021, pp. 1-5.
Garg et al., "Learning to Predict Vulnerabilities From Vulnerability-Fixes: A Machine Translation Approach", URL: https:/arxiv.org/pdf/2012.11701.pdf, 2020, 12 pages.
Github, "Your AI pair programmer", URL: https://copilot.github.com/, 2021, 12 pages.
Golagha et al., "Can We Predict the Quality of Spectrum based Fault Localization?", 13th IEEE International Conference on Software Testing, Validation and Verification, IST, IEEE, Oct. 24-28, 2020, pp. 4-15.
Gowal et al., "On the Effectiveness of Interval Bound Propagation for Training Verifiably Robust Models", URL: https://arxiv.org/pdf/1810.12715.pdf, 2018, 16 pages.
Graves et al., "Automated Curriculum Learning for Neural Networks", Proceedings of the 34th International Conference on Machine Learning, PMLR, vol. 70, 2017, 10 pages.
Gros et al., "Code to Comment "Translation": Data, Metrics, Baselining & Evaluation", 35th IEEE/ACM International Conference on Automated Software Engineering, ASE, IEEE, Sep. 21-25, 2020, pp. 746-757.
Guo et al., "LEMNA: Explaining Deep Learning based Security Applications", Proceedings of the ACM SIGSAC Conference on Computer and Communications Security, Oct. 15-19, 2018, 16 pages.
Gupta et al., "Locating Faulty Code Using Failure-Inducing Chops", Proceedings of the 20th IEEE/ACM International Conference on Automated Software Engineering, Nov. 7-11, 2005, pp. 263-272.
Hacohen et al., "On The Power of Curriculum Learning in Training Deep Networks", Proceedings of the 36th International Conference on Machine Learning, Proceedings of Machine Learning Research, vol. 97, 2019, 13 pages.
Iyer et al., "Summarizing Source Code using a Neural Attention Model", Proceedings of the 54th Annual Meeting of the Association for Computational Linguistics, Aug. 7-12, 2016, pp. 2073-2083.
Kim et al., "Code Prediction by Feeding Trees to Transformers", 43rd IEEE/ACM International Conference on Software Engineering, ICSE, May 22-30, 2021, pp. 150-162.
Kingma et al., "Adam: A Method for Stochastic Optimization", URL: https://arxiv.org/pdf/1412.6980.pdf, 2017, pp. 1-15.
Laidlaw et al., "Perceptual Adversarial Robustness: Defense Against Unseen Threat Models", International Conference on Learning Representations, 2020, pp. 1-22.
Li et al., "Gated Graph Sequence Neural Networks", International Conference on Learning Representations, 2017, pp. 1-20.
Li et al., "SySeVR: A Framework for Using Deep Learning to Detect Software Vulnerabilities", URL: https://arxiv.org/pdf/1807.06756v2.pdf, 2018, pp. 1-13.
Li et al., "VulDeePecker: A Deep Learning-Based System for Vulnerability Detection", 25th Annual Network and Distributed System Security Symposium, Feb. 18-21, 2018, pp. 1-15.
Liu et al., "Multi-task Learning based Pretrained Language Model for Code Completion", 35th IEEE/ACM International Conference on Automated Software Engineering, Sep. 21-25, 2020. pp. 473-485.
Liu et al., "Learning to Spot and Refactor Inconsistent Method Names", Proceedings of the 41st International Conference on Software Engineering, May 25-31, 2019, pp. 1-12.

(56) References Cited

OTHER PUBLICATIONS

"Lizard", A simple code complexity analyser, URL: https://github.com/terryyin/lizard, 2012, pp. 1-9.

Lou et al., "Boosting Coverage-Based Fault Localization via Graph-Based Representation Learning", 29th ACM Joint European Software Engineering Conference and Symposium on the Foundations of Software Engineering, ACM, Aug. 23-28, 2021, pp. 664-676.

Lundberg et al., "A unified approach to interpreting model predictions", 31st Conference on Neural Information Processing Systems, Advances in Neural Information Processing Systems, 2017, pp. 1-10.

Zhou et al., "Devign: Effective Vulnerability Identification by Learning Comprehensive Program Semantics via Graph Neural Networks", Advances in Neural Information Processing Systems (NeurIPS) 32, 2019, pp. 1-11.

Mazuera-Rozo et al., "Shallow or Deep? An Empirical Study on Detecting Vulnerabilities using Deep Learning", 29th IEEE/ACM International Conference on Program Comprehension, May 20-21, 2021, 12 pages.

"Pmccabe: McCabe style function complexity and line counting for C and C++", URL: https://people.debian.org/~bame/omccabe, McCabe, 1992-2021, pp. 1-2.

Mirshokraie et al., "Efficient JavaScript Mutation Testing", 2013 IEEE Sixth International Conference on Software Testing, Verification and Validation, 2013, pp. 74-83.

Misherghi et al., "HDD: Hierarchical Delta Debugging", Proceedings of the 28th International Conference on Software Engineering, May 20-28, 2006, 10 pages.

Mohapatra et al., "Towards Verifying Robustness of Neural Networks against a Family of Semantic Perturbations", Proceedings of the IEEE/CVF Conference on Computer Vision and Pattern Recognition, 2020, pp. 1-12.

Nguyen et al., "Focus: A Recommender System for Mining API Function Calls and Usage Patterns", Proceedings of the 41st International Conference on Software Engineering, May 25-31, 2019, pp. 1050-1060.

\* cited by examiner

300

| # | Source Code Sample 123 and Simplified Source Code Samples 126 | Valid? | Vulnerability Detected? |
|---|---|---|---|
| 1 | void foo (int a) {int b = 10; int buf[10]; a + 3; buf[b] = 1;} | ✓ | ✓ |
| 2 | 10]; a + 3; buf[b] = 1;} | ✗ | |
| 3 | void foo (int a) {int b = 10; int buf[ | ✗ | |
| 4 | int b = 10; int buf[10]; a + 3; buf[b] = 1;} | ✗ | |
| 5 | void foo (int a) { [10]; a + 3; buf[b] = 1;} | ✗ | |
| ... | ...... | | |
| 13 | void foo (int a) {int b = 10; int buf[10]; buf[b] = 1;} | ✓ | ✓ |
| ... | ...... | | |
| 21 | void foo (int a) {int b = 10; int buf[10]; buf[ = 1;} | ✗ | |
| 22 | void foo (int a) {int b = 10; int buf[10]; buf[b] ;} | ✓ | ✓ |
| ... | ...... | | |

FIG. 3

TRAINING DATA AUGMENTATION VIA PROGRAM SIMPLIFICATION

BACKGROUND

The subject disclosure relates to augmenting training data for one or more artificial intelligence ("AI") models, and more specifically, augmenting one or more AI model training datasets by simplifying source code samples.

AI models are employed in a variety of source code understanding tasks, such as: defect detection, code summarization, code completion, bug fixing, function and variable naming, code recommendation, software development workflows, and/or the like. However, training AI models for source code understanding tasks can face a variety of reliability concerns, including: data duplication bias, labeling quality, low robustness and/or generalization, model overfitting (e.g., due to dataset size limitations), class imbalance (e.g., due to a mismatch between sample counts belonging to different classes), and/or the like. For example, performance quality of the AI model can be affected by whether the model is learning task-relevant aspects of the source code.

For instance, a traditionally trained AI model can learn a separator between defective and healthy source code samples using non-representative signals to the given task, such as unexpected correlations between code samples. Thereby, the AI models is trained to learn dataset nuances, which can result in performance failure when applied to settings outside of a theoretical context.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can generate one or more augmented training datasets for training one or more artificial intelligence models are described.

According to an embodiment, a system is provided. The system can comprise a memory that can store computer executable components. The system can also comprise a processor, operably coupled to the memory, and that can execute the computer executable components stored in the memory. The computer executable components can comprise training augmentation component that generates an augmented training dataset for training an artificial intelligence model by extracting a simplified source code sample from a source code sample comprised within a training dataset. An advantage of such a system can be the generation of additional training samples for training the artificial intelligence model.

In some examples, the system can also comprise a validation component that can validate a correctness of the simplified source code sample. Further, the system can comprise a labeler component that can label the simplified source code sample via a task-specific labeling scheme. An advantage of such a system can be the implementation of quality control over newly generated training samples.

According to another embodiment, a system is provided. The system can comprise a memory that can store computer executable components. The system can also comprise a processor, operably coupled to the memory, and that can execute the computer executable components stored in the memory. The computer executable components can comprise a model training component that can train an artificial intelligence model on an augmented training dataset that comprises a simplified source code sample of a source code sample from a training dataset.

In some examples, the system can comprise a simplification component that can execute a simplification algorithm to generate the simplified source code sample by reducing the source code sample. An advantage of such a system can be the generation of new training samples with the potential of comprising less noisy data.

According to an embodiment, a computer-implemented method is provided. The computer-implemented method can comprise generating, by a system operatively coupled to a processor, an augmented training dataset for training an artificial intelligence model by extracting a simplified source code sample from a source code sample comprised within a training dataset. An advantage of such a computer-implemented method can be improved performance by the artificial intelligence model by enabling the model to focus on task relevant aspects of the training samples.

In some examples, the computer-implemented method can comprise generating, by the system, a plurality of simplified source code samples from the source code sample via series of iterative reductions of the source code sample. The simplified source code sample can be from the plurality of simplified source code samples. An advantage of such a computer-implemented method can be the generation of multiple simplified source code samples from a single parent source code sample.

According to another embodiment, a computer-implemented method is provided. The computer-implemented method can comprise training, by a system operatively coupled to a processor, an artificial intelligence model on an augmented training dataset that comprises a simplified source code sample of a source code sample from a training dataset.

In some examples, the computer-implemented method can comprise validating, by the system, a correctness of the simplified source code sample. Also, the computer-implemented method can comprise labeling, by the system, the simplified source code sample via a task based labeling scheme. Further, the computer-implemented method can comprise adding, by the system, the simplified source code sample to the training dataset subsequent to the validating and labeling. An advantage of such a computer-implemented method can be the training of the artificial intelligence system on an augmented training dataset that comprises both the original source code sample and the simplified source code sample.

According to an embodiment, a computer program product for training an artificial intelligence model is provided. The computer program product can comprise a computer readable storage medium having program instructions embodied therewith. The program instructions can be executable by a processor to cause the processor to generate, by the processor, an augmented training dataset for training the artificial intelligence model by extracting a simplified source code sample from a source code sample comprised within a training dataset. An advantage of such a computer program product can be a reduction in overfitting and/or class imbalance during training the artificial intelligence model.

In some examples, the program instructions can further cause the processor to generate, by the processor, a plurality of simplified source code samples from the source code sample via series of iterative reductions of the source code sample. The simplified source code sample can be from the plurality of simplified source code samples. Also, the iterations of the series of iterative reductions can generate a new simplified source code sample that can be simpler than a previous simplified source code sample generated by the series of iterative reductions. Further, program instructions can cause the processor to employ, by the processor, a Delta Debugging algorithm to perform the series of iterative reductions. An advantage of such a computer program product can be a more scalable generation of simplified source code samples via a more efficient source code token reduction scheme.

BRIEF DESCRIPTION OF THE DRAWINGS

FIG. 3 illustrates a diagram of an example, non-limiting table depicting example validation and/or labeling of simplified source code samples that can be performed in accordance with one or more embodiments described herein.

DETAILED DESCRIPTION

Figure 1:
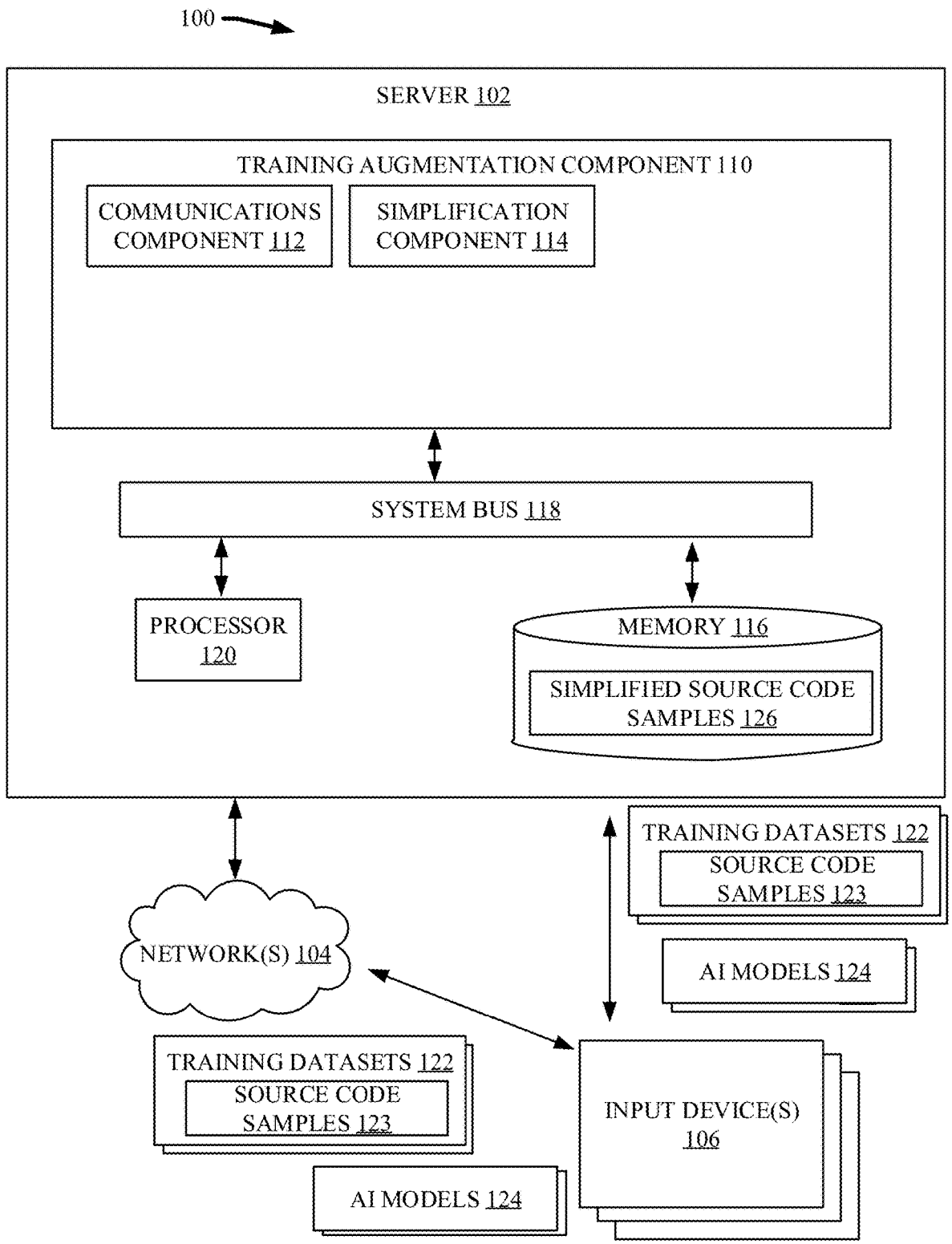
FIG. 1 illustrates a block diagram of an example, non-limiting system that can facilitate training one or more AI models on one or more augmented training datasets in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the problems with other implementations of AI model training; the present disclosure can be implemented to produce a solution to one or more of these problems by augmenting the training dataset via one or more simplification processes to create a distribution of source code samples with varying code complexity. Advantageously, one or more embodiments described herein can employ a data-driven approach to assist one or more AI models in focusing on task-relevant aspects of a given source code during training. For instances, one or more embodiments described herein can incorporate code complexity into the AI model learning. By employing a data-driven approach, one or more embodiments described herein can be task-agnostic, programming language-agnostic, and/or application to a wide variety of AI model types (e.g., including classical machine learning models, such as linear regression, support vector machines, decision trees, principal component analysis, naïve Bayes classifier, neural network architectures, such as convolutional neural networks ("CNN"), recurrent neural networks ("RNN"), graph neural networks ("GNN"), a combination thereof, and/or the like).

Various embodiments of the present invention can be directed to computer processing systems, computer-implemented methods, apparatus and/or computer program products that facilitate the efficient, effective, and autonomous (e.g., without direct human guidance) AI model training. For example, one or more embodiments described herein can augment one or more training datasets by simplifying one or more source code samples. For instance, simplified program samples can be generating by employing a simplification algorithm such as Delta Debugging. Thereby, various embodiments described herein can augment the one or more training datasets with, for example, smaller and potentially less noisy source code samples, while preserving the task profile of the training dataset.

The computer processing systems, computer-implemented methods, apparatus and/or computer program products employ hardware and/or software to solve problems that are highly technical in nature (e.g., AI model training), that are not abstract and cannot be performed as a set of mental acts by a human. For example, an individual, or a plurality of individuals, cannot readily augment training datasets via a program simplification scheme while preserving the task profile of the training datasets. Also, one or more embodiments described herein can constitute a technical improvement over conventional AI model training by augmenting training datasets to create a variety of training samples with varying code complexity. Further, one or more embodiments described herein can have a practical application by improving the training of AI models via a data-driven approach that is task-agnostic and applicable to a wide variety of AI model architectures. For instance, various embodiments described herein can incorporate code complexity awareness to enable task-relevant learning for one or more AI models. One or more embodiments described herein can control the training protocol of one or more AI models by augmenting the one or more training datasets to generate a plurality of simplified source code samples.

FIG. 1 illustrates a block diagram of an example, non-limiting system 100 that can augment one or more training datasets for training one or more AI models. Repetitive description of like elements employed in other embodiments described herein is omitted for the sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines (e.g., computers, computing devices, virtual machines, a combination thereof, and/or the like) can cause the machines to perform the operations described.

As shown in FIG. 1, the system 100 can comprise one or more servers 102, one or more networks 104, and/or one or more input devices 106. The server 102 can comprise training augmentation component 110. The training augmentation component 110 can further comprise communications component 112 and/or simplification component 114. Also, the server 102 can comprise or otherwise be associated with at least one memory 116. The server 102 can further comprise a system bus 118 that can couple to various components such as, but not limited to, the training augmentation component 110 and associated components, memory 116 and/or a processor 120. While a server 102 is illustrated in FIG. 1, in other embodiments, multiple devices of various types can be associated with or comprise the features shown in FIG. 1. Further, the server 102 can communicate with one or more cloud computing environments.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the training augmentation component 110 can be provided on the one or more servers 102, it should be appreciated that the architecture of system 100 is not so limited. For example, the training augmentation component 110, or one or more components of training augmentation component 110, can be located at another computer device, such as another server device, a client device, and/or the like.

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. The one or more input devices 106 can be employed to enter one or more training datasets 122 and/or AI models 124 into the system 100, thereby sharing (e.g., via a direct connection and/or via the one or more networks 104) said data with the server 102. For example, the one or more input devices 106 can send data to the communications component 112 (e.g., via a direct connection and/or via the one or more networks 104). Additionally, the one or more input devices 106 can comprise one or more displays that can present one or more outputs generated by the system 100 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

In various embodiments, the one or more input devices 106 and/or the one or more networks 104 can be employed to input one or more settings and/or commands into the system 100. For example, in the various embodiments described herein, the one or more input devices 106 can be employed to operate and/or manipulate the server 102 and/or associate components. Additionally, the one or more input devices 106 can be employed to display one or more outputs (e.g., displays, data, visualizations, and/or the like) generated by the server 102 and/or associate components. Further, in one or more embodiments, the one or more input devices 106 can be comprised within, and/or operably coupled to, a cloud computing environment.

For example, in one or more embodiments the one or more input devices 106 can be employed to enter one or more training datasets 122 (e.g., comprising one or more source code samples 123) into the system 100, which can be stored in the one or more memories 116. Further, the training augmentation component 110 can utilize the one or more training datasets to train one or more AI models 124 (e.g., for one or more source code understanding tasks). For example, the one or more training datasets 122 can comprise one or more source code samples 123. In one or more embodiments, the one or more input devices 106 can also be employed to enter one or more AI models 124 into the system 100, which can be stored in the one or more memories 116 and/or trained by the training augmentation component 110. Further, in various embodiments, the one or more input devices 106 can be employed to define one or more settings and/or parameters of the AI model 124 training. In various embodiments, the communications component 112 can share one or more inputs (e.g., entered into the system 100 via the one or more input devices 106) with the associate components of the training augmentation component 110 in accordance with one or more embodiments described herein.

In various embodiments, the one or more AI models 124 can be used to facilitate one or more machine learning tasks. In one or more embodiments, the AI models 124 can simulate a number of interconnected processing units that can resemble abstract versions of neurons. For example, the processing units can be arranged in a plurality of layers (e.g., one or more input layers, one or more hidden layers, and/or one or more output layers) connected with by varying connection strengths (e.g., which can be commonly referred to within the art as "weights"). AI models 124 can learn through training, wherein data with known outcomes is inputted into the computer model, outputs regarding the data are compared to the known outcomes, and/or the weights of the computer model are autonomous adjusted based on the comparison to replicate the known outcomes. As the one or more AI models 124 train, the computer model can become increasingly accurate; thus, trained AI models 124 can accurately analyze data with unknown outcomes, based on lessons learning from training data, to facilitate one or more machine learning tasks. Example AI models 124 can include, but are not limited to: perceptron ("P"), feed forward ("FF"), radial basis network ("RBF"), deep feed forward ("DFF"), recurrent neural network ("RNN"), long/ short term memory ("LSTM"), gated recurrent unit ("GRU"), auto encoder ("AE"), variational AE ("VAE"), denoising AE ("DAE"), sparse AE ("SAE"), markov chain ("MC"), Hopfield network ("HN"), Boltzmann machine ("BM"), deep belief network ("DBN"), deep convolutional network ("DCN"), deconvolutional network ("DN"), deep convolutional inverse graphics network ("DCIGN"), generative adversarial network ("GAN"), liquid state machine ("LSM"), extreme learning machine ("ELM"), echo state network ("ESN"), deep residual network ("DRN"), kohonen network ("KN"), support vector machine ("SVM"), and/or neural turing machine ("NTM").

In one or more embodiments, the training augmentation component 110 can augment the one or more training datasets 122 to facilitate training the one or more AI models 124. For example, the training augmentation component 110 can comprise simplification component 114, which can execute one or more simplification algorithms to generate simplified source code samples 126 from the one or more training datasets 122. As shown in FIG. 1, in one or more embodiments the simplified source code samples 126 generated by the simplification component 114 can be stored, for example, in the one or more memories 116. In various embodiments, the one or more simplified source code samples 126 can be smaller samples derived from a parent source code sample 123 comprised in the one or more training datasets 122; thereby, the training augmentation component 110 can increase the number of training samples employed to train the one or more AI models 124 from the one or more training datasets 122.

For example, the simplification component 114 can simplify a source code sample 123 comprised within the one or more training datasets 122 into a single simplified source code sample 126. In another example, the simplification component 114 can simplify a single source code sample 123 comprised within the one or more training datasets 122 into a plurality of simplified source code samples 126. In one or more embodiments, the simplification component 114 can simplify a source code sample 123 comprised within the one or more training datasets 122 into multiple simplified source code samples 126 based on size, where the number of simplified source code samples 126 generated from a source code sample 123 can increase as the size of the source code sample 123 increases. For instance, as the source code sample 123 from the one or more training datasets 122 increases, the simplification component 114 can perform additional reduction iterations via one or more simplification algorithms; resulting in more simplified source code samples 126.

Further, the simplification component 114 can simplify each of the source code samples 123 comprised within the one or more training datasets 122 or a portion of the source code samples 123 comprised within the one or more training datasets 122. For instance, in one or more embodiments the simplification component 114 can simplify all, or substantially all, the source code samples 123 comprised within the one or more training datasets 122. In another instance, in one or more embodiments the simplification component 114 can simplify source code samples 123 comprised within the one or more training datasets 122 that have a code complexity, or a size, greater than a defined threshold (e.g., as defined by one or more code complexity metrics).

In various embodiments, the simplification component 114 can employ any simplification algorithm that can reduce a source code sample 123 input while generating a reduced sample (e.g., simplified source code sample 126) that retains the task-relevant features for the source code understanding task to be performed by the one or more AI models 124. Example simplification algorithms can include, but are not limited to, algorithms that can drop tokens and/or statements from a source code sample 123 in naïve manner, a randomized manner, a brute-force manner, or via a scalable reduction scheme (e.g., such as a Delta Debugging algorithm).

For instance, the simplification component 114 can employ the Delta Debugging algorithm to generate the one or more simplified source code samples 126; however, the architecture of the simplification component 114 is not limited to employing the Delta Debugging algorithm. The simplification component 114 can employ the simplification algorithm (e.g., Delta Debugging algorithm) to successively simplify a given source code sample 123 from the one or more training datasets 122 while maintaining the task profile established by the given source code sample 123 (e.g., maintaining the vulnerability profile of healthy or defective code in the case of a vulnerability detection setting). For example, the simplification component 114 can employ the one or more simplification algorithms to iteratively remove source code tokens from a source code sample 123 subject to the simplification procedure, where each iteration of source code token removal can generate a respective simplified source code sample 126. In various embodiments, the simplification component 114 can remove tokens based on, for example: a smart reduction akin to a binary search (e.g., via the Delta Debugging algorithm), a linear approach (e.g., removing tokens one at a time via multiple iterations), a randomized approach (e.g., where tokens are randomly selected from the source code sample 123 for removal), operation at a multi-token level, operation at a statement level, operation at a multi-statement level a combination thereof, and/or the like. At least because the simplified source code samples 126 are reductions of the source code samples 123 from the training datasets 122, the simplified source code samples 126 can comprise less noise data than the one or more training datasets 122.

Figure 2:
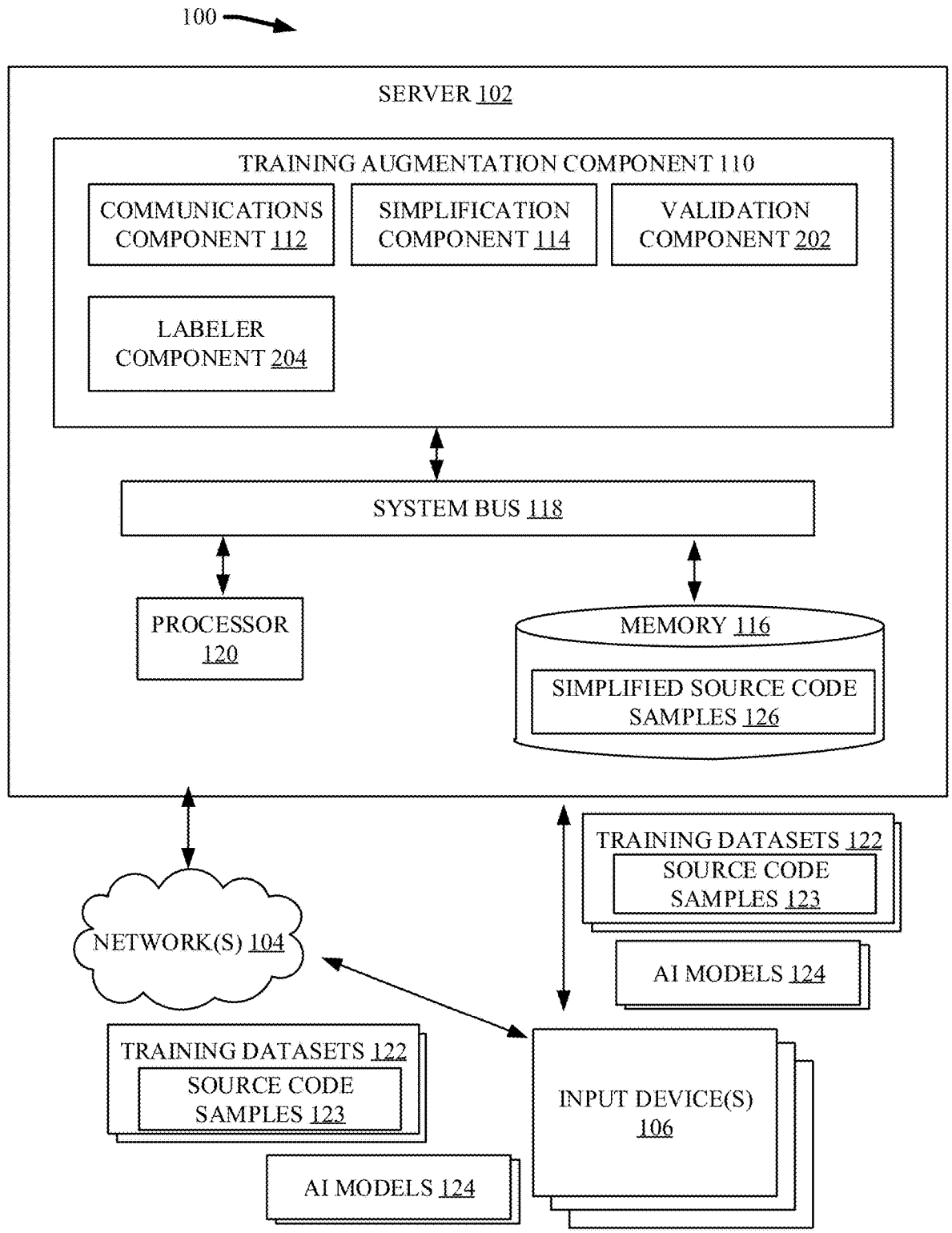
FIG. 2 illustrates a block diagram of an example, non-limiting system that can validate and/or label simplified source code samples for augmenting one or more training datasets that can be employed to train one or more AI models in accordance with one or more embodiments described herein.

FIG. 2 illustrates a diagram of the example, non-limiting system 100 further comprising validation component 202 and/or labeler component 204 in accordance with one or more embodiments described herein. Repetitive description of like elements employed in other embodiments described herein is omitted for the sake of brevity. In various embodiments, the simplified source code samples 126 generated by the simplification component 114 can be analyzed by the validation component 202 and/or labeler component 204 to identify suitable candidates for augmenting the one or more training datasets 122.

In one or more embodiments, the validation component 202 can determine whether the simplified source code samples 126 are correct (e.g., are able to be compiled and/or executed). For example, the validation component 202 can determine whether the simplified source code samples 126 can be compiled and/or executed. For instance, the simplification component 114 can generate simplified source code samples 126 regardless of whether the reduction (e.g., source code token reduction) renders the resulting simplified source code samples 126 incorrect (e.g., not capable of compiling and/or inexecutable). The validation component 202 can identify simplified source code samples 126 that remain correct after the reduction performed by the simplification component 114. For example, the validation component 202 can be a compiler, where valid simplified source code samples 126 can be capable of being compiled (e.g., even if the compiled simplified source code sample 126 operates in a different manner than the parent source code sample 123 from which it is derived) and invalid simplified source code samples 126 can be incapable of being compiled. In various embodiments, the training augmentation component 110 can discard invalid simplified source code samples 126, such that invalid simplified source code samples 126 can be absent from the augmentation of the one or more training datasets 122. In another example, the validation component 202 can be tailored (e.g., via one or more settings defined by the one or more input devices 106) to ensure key aspects of the parent source code sample 123 (e.g., API calls, code variables, and/or other constructs of the like) are preserved.

In one or more embodiments, valid simplified source code samples 126 can be further analyzed by the labeler component 204 to determine whether the valid simplified source code samples 126 have the same task profile as the one or more parent source code sample 123 from which the valid simplified source code samples 126 are derived. In one or more embodiments, the labeler component 204 can: comprise labeler computer logic comprised in the one or more training datasets 122; employ line-based code feature matching (e.g., comparing simplified source code samples 126 to parent source code samples 123 from the one or more training datasets 122; comprise a static analyzer, comprise a fuzz testing algorithm, can be facilitated by a subject matter expert, a combination thereof, and/or the like. Further, the labeler component 204 can label the valid simplified source code samples 126 that exhibit the same task profile as the parent source code sample 123. For example, a simplified source code sample 126 can exhibit the same task profile as the parent source code sample 123 where generation of the simplified source code sample 126 avoids generation of one or more new defects. For instance, a simplified source code sample 126 can exhibit the same task profile as the parent source code sample 123 where the simplified source code sample 126: is free from defects; or comprises one or more defects or other task relevant features, but the one or more defects, or other task relevant features, are also present in the parent source code sample 123. Simplified source code samples 126 that exhibit a different task profile than the parent source code sample 123 from which they originate can comprise one or more defects that are absent from the parent source code sample 123. In one or more embodiments, the labeler component 204 can store (e.g., and/or accordingly label) those simplified source code samples 126 that exhibit the same task profile as the parent source code sample 123. In one or more embodiments, the labeler component 204 can store (e.g., and/or accordingly label) those simplified source code samples 126 that exhibit a different task profile than the parent source code sample 123.

In various embodiments, the labeling performed by the labeler component 204 can be based on the machine learning task to be performed by the one or more AI models 124. For example, the labeler component 204 can label simplified source code samples 126 (e.g., which have been determined to be valid and/or maintain the task profile of the parent source code sample 123) in accordance with one or more labeling schemes defined by the task of the one or more AI models 124 (e.g., in accordance with a task-specific oracle code). For instance, with regards to a vulnerability task, the labeler component 204 can label simplified source code samples 126 comprising a defined vulnerability as "1" and simplified source code samples 126 lacking the defined vulnerability "0". In one or more embodiments, the label parameters employed by the labeler component 204 can be customized (e.g., via the one or more input devices 106) based on the task to be performed by the one or more AI models 124. Additionally, in one or more embodiments, the labeler component 204 can determine one or more confidence values associated with the generated labels assigned to the simplified source code samples 126.

For example, the labeler component 204 can determine whether: the simplified source code samples 126 comprise the same defects, or other features relevant to the given source code understanding task, of the one or more source code samples 123 from which the one or more simplified source code samples 126 are derived; are free from defects; or comprise new defects (e.g., as compared to the one or more source code samples 123 from which the simplified source code samples 126 are derived). Where a simplified source code sample 126 is absent of defects; the labeler component 204 can determine that the simplified source code sample 126 maintains the task profile, and can label the simplified source code sample 126 in accordance with a task-based labeling scheme. Where a simplified source code sample 126 comprises one or more defects, and the one or more defects are also comprised within the source code sample 123 from which the simplified source code sample 126 originates; the labeler component 204 can determine that the simplified source code sample 126 maintains the task profile, and can label the simplified source code sample 126 in accordance with a task-based labeling scheme. Where a simplified source code sample 126 comprises one or more defects that are not comprised within the within the source code sample from which the simplified source code sample 126 originates; the labeler component 204 can determine that the simplified source code sample 126 has a different task profile as the parent source code sample 123, which can render the simplified source code sample 126 unsuitable for augmenting the one or more training datasets 122. Thereby, the labeler component 204 can ensure that one or more training dataset 122 augmentations performed by the training augmentation component 110 can avoid introducing new defects (e.g., as compared to the one or more training datasets 122) into training the one or more AI models 124.

FIG. 3 illustrates a diagram of an example, non-limiting table 300 that can include an example source code sample 123 from one or more training datasets 122 and/or simplified source code samples 126 that can be analyzed by the validation component 202 and/or labeler component 204 in accordance with one or more embodiments described herein. Repetitive description of like elements employed in other embodiments described herein is omitted for the sake of brevity. Source code sample #1 can be an exemplary source code sample from one or more training datasets 122 for training one or more AI models 124 in a vulnerability detection task. In accordance with the various embodiments described herein, the simplification, validation, and/or labelling performed by the training augmentation component 110 is not limited to a particular type of source code sample 123 or source code understanding task.

As shown in FIG. 3, example source code samples #2-22 can be exemplary simplified source code samples 126 generated by the simplification component 114. For example, the simplification component 114 can reduce example source code sample #1 in half to generate example source code samples #2-3. Additionally, the simplification component 114 can remove one or more tokens from example source code sample #1 to generate example simplified source code samples #3-22. For example, the simplification component 114 can iteratively reduce example source code sample #1 with finer granularity to reach a token-level reduction.

The validation component 202 can attempt to compile the example source code samples #1-22 (e.g., including the simplified source code samples 126). Where a simplified source code sample 126 can be compiled, the validation component 202 can determine that the source code sample 126 is valid (e.g., as indicated by a check mark in table 300). Where a simplified source code sample 126 cannot be compiled, the validation component 202 can determine that the source code sample 126 is invalid (e.g., as indicated by an "X" in table 300). As shown in FIG. 3, the validation component 202 can determine that example source code sample #13 and #22 can be valid simplified source code samples 126; while example source code samples #2-5 and #21 can be invalid simplified source code samples 126.

Further, the labeler component 204 can determine whether example source code samples #2-22 (e.g., simplified source code samples 126) can exhibit the same task profile as example source code sample #1 (e.g., the parent source code sample 123) in accordance with the various embodiments described herein. For example, the labeler component 204 can determine that valid simplified source code samples #13 and #22 maintain the task profile of source code sample #1 at least because example simplified source code samples #13 and #22 lack a defect and/or comprise defects that are also present in example source code sample #1. Further, the labeler component 204 can label the example source code samples #13 and #22 based on whether the simplified source code samples 126 comprise one or more defined vulnerabilities.

Figure 4:
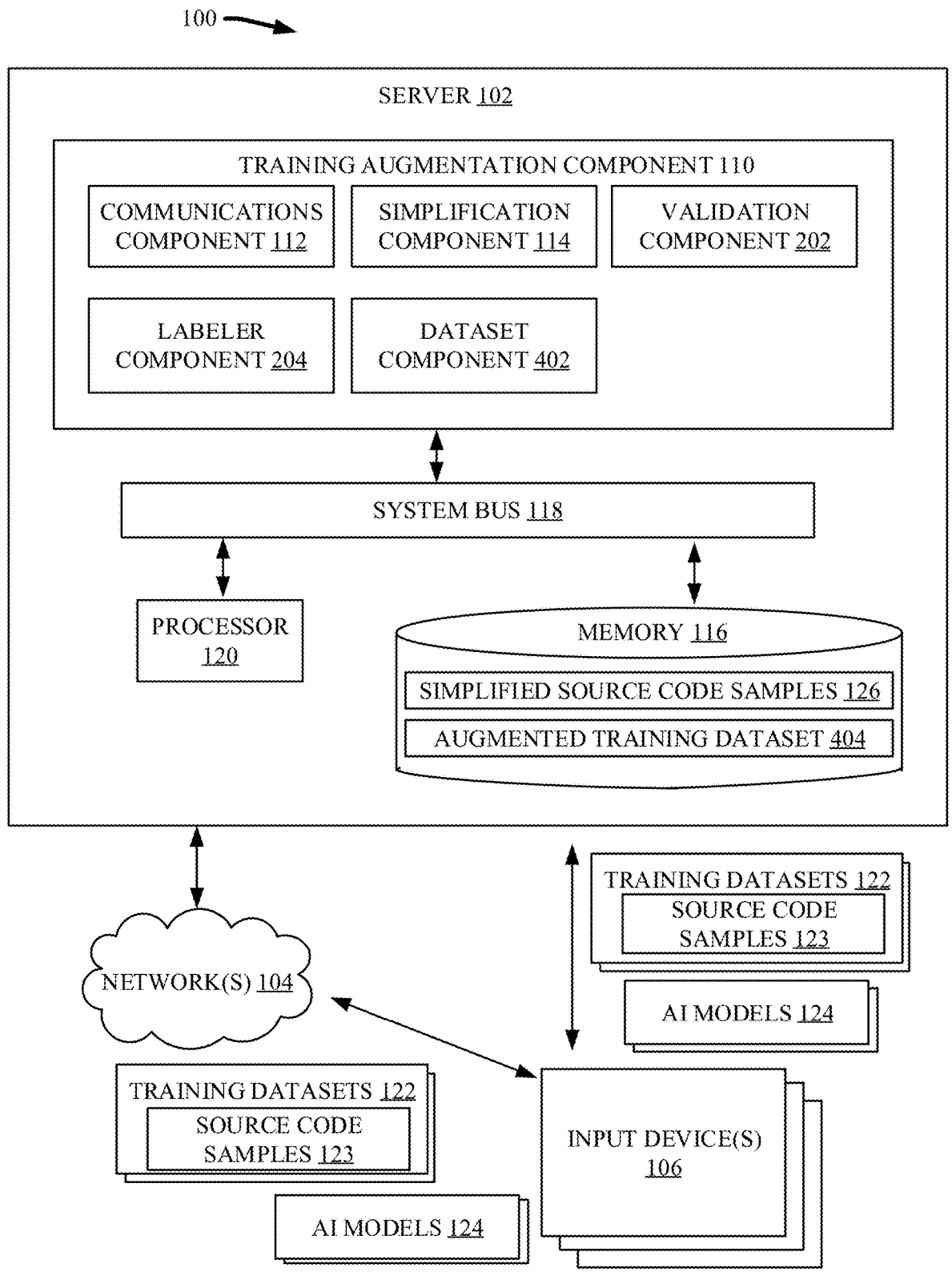
FIG. 4 illustrates a diagram of an example, non-limiting system that can generate one or more augmented training datasets for training one or more AI models in accordance with one or more embodiments described herein.

FIG. 4 illustrates a diagram of the example, non-limiting system 100 further comprising dataset component 402 in accordance with one or more embodiments described herein. Repetitive description of like elements employed in other embodiments described herein is omitted for the sake of brevity. In various embodiments, the dataset component 402 can generate one or more augmented training datasets 404 utilizing simplified source code samples 126 determined to be valid and/or suitable by the validation component 202 and/or labeler component 204.

For example, the augmented training dataset 404 can comprise: all, or substantially all, the simplified source code samples 126 found valid and/or labelled in combination with all, or substantially all, the source code samples 123 of the one or more training datasets 122; all, or substantially, of the simplified source code samples 126 found valid and/or labelled in combination with a portion of the source code samples 123 of the one or more training datasets 122; a portion of the simplified source code samples 126 found valid and/or labelled in combination with all, or substantially all, the source code samples 123 of the one or more training datasets 122; a portion of the simplified source code samples 126 found valid and/or labelled in combination with a portion of the source code samples 123 of the one or more training datasets 122; and/or just the simplified source code samples 126 found to be valid and/or labelled.

For instance, the dataset component 402 can reduce overfitting during training the one or more AI models 124 by combining the source code samples 123 of the training datasets 122 with the simplified source code samples 126 determined (e.g., via validation component 202 and/or labeler component 204) to be valid and/or labelled to generate the one or more augmented training datasets 404. For example, adding the labelled and/or validated simplified source code samples 126 to the one or more training datasets 122 can generate one or more augmented training datasets 404 that comprise more training samples than originally provided by the training datasets 122. The additional volume of training samples can reduce the percentage of noise data including in training the one or more AI models 124 and/or facilitate the one or more AI models 124 in learning task-relevant aspects of the training datasets 122.

In another instance, the dataset component 402 can reduce class imbalance during training the one or more AI models 124 by adding minority classified simplified source code samples 126 (e.g., determined to be valid and/or suitable) to the one or more training datasets 122 to generate the one or more augmented training datasets 404. For example, the source code samples 123 comprised within the one or more training datasets 122 can be classified into two or more classes, where the distribution of the source code samples 123 can be imbalanced between the classes. To reduce the imbalance, the dataset component 402 can add valid simplified source code samples 126 labelled as belonging to the underpopulated class to the one or more training datasets 122 to generate the one or more augmented training datasets 404, where valid simplified source code samples 126 labelled as belonging to the other class can be kept out of the one or more augmented training datasets 404.

Figure 5:
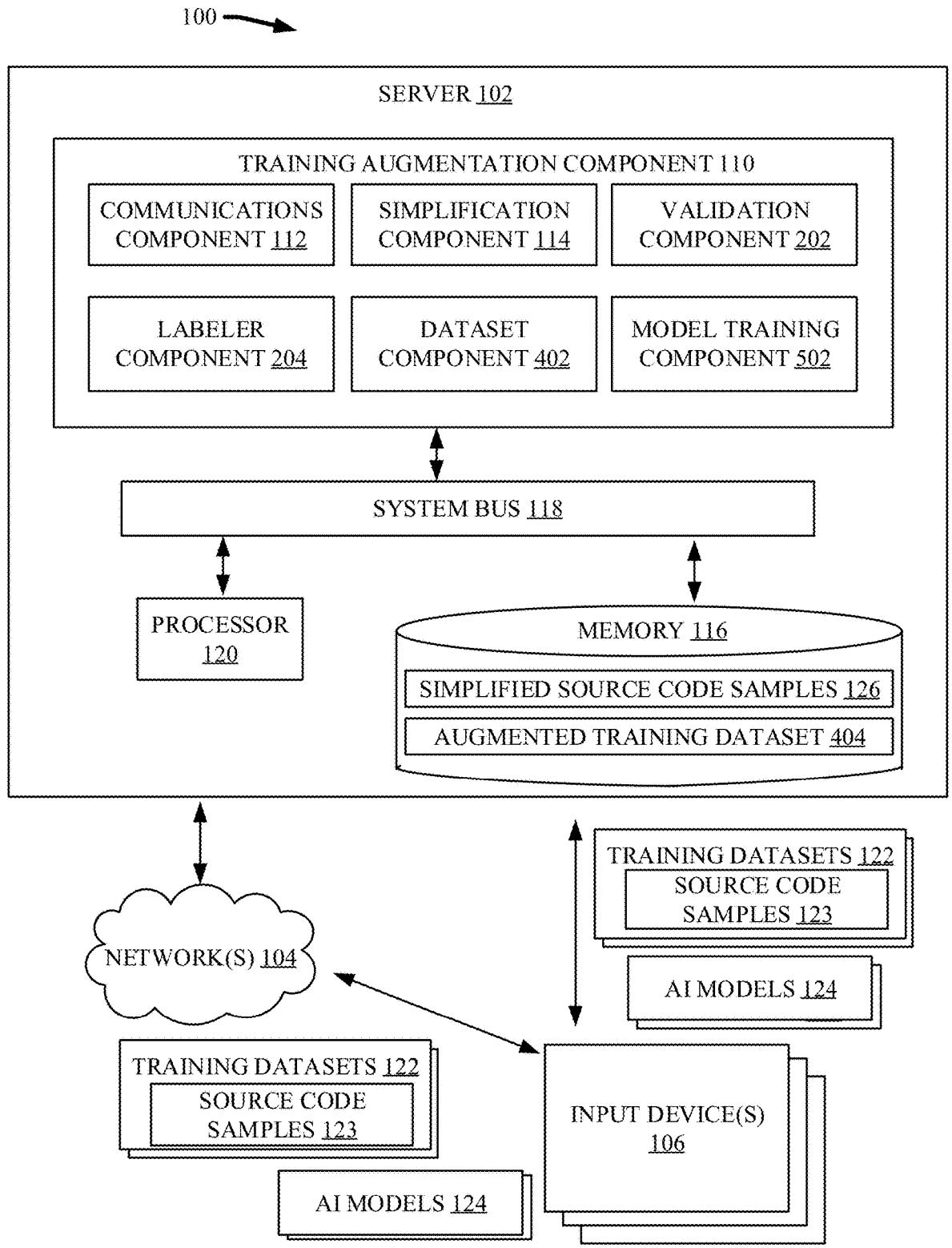
FIG. 5 illustrates a diagram of an example, non-limiting system that can train one or more AI models on one or more augmented training datasets in accordance with one or more embodiments described herein.

FIG. 5 illustrates a diagram of the example, non-limiting system 100 further comprising model training component 502 in accordance with one or more embodiments described herein. Repetitive description of like elements employed in other embodiments described herein is omitted for the sake of brevity. In various embodiments, the model training component 502 can train the one or more AI models 124 on the one or more augmented training datasets 404 and/or training datasets 122 for one or more source code understanding tasks (e.g., defined via the one or more input devices 106).

In one or more embodiments, the one or more augmented training datasets 404 can comprise source code samples 123 from the one or more training datasets 122 and the simplified source code samples 126 that have been validated and/or labelled; where the model training component 502 can randomly sample from the one or more augmented training datasets 404 to train the one or more AI models 124. Alternatively, the model training component 502 can sample from the augmented training datasets 404 based on one or more parameters of the source code samples 123 and/or simplified source code samples 126. For example, the model training component 502 can sample from the one or more augmented training datasets 404 based on noise data content, code complexity, size, class labels, confidence values, a combination thereof, and/or the like. For instance, the model training component 502 can sample the one or more augmented training datasets 404 such that samples are fed to the one or more AI models 124 in a progressive order from smallest to largest. In another instance, the model training component 502 can sample the one or more augmented training datasets 404 such that samples are fed to the one or more AI models 124 in a progressive order from least code complexity to most code complexity.

In one or more embodiments, the one or more augmented training datasets 404 can comprise just the simplified source code samples 126 that have been validated and/or labelled; where the model training component 502 can sample from the one or more training datasets 122 in addition to randomly sampling from the one or more augmented training datasets 404. In one or more embodiments, the one or more augmented training datasets 404 can comprise just the simplified source code samples 126 that have been validated and/or labelled; where the model training component 502 can sample (e.g., randomly or in accordance with a progressive order) from just the one or more augmented training datasets 404.

Figure 6:
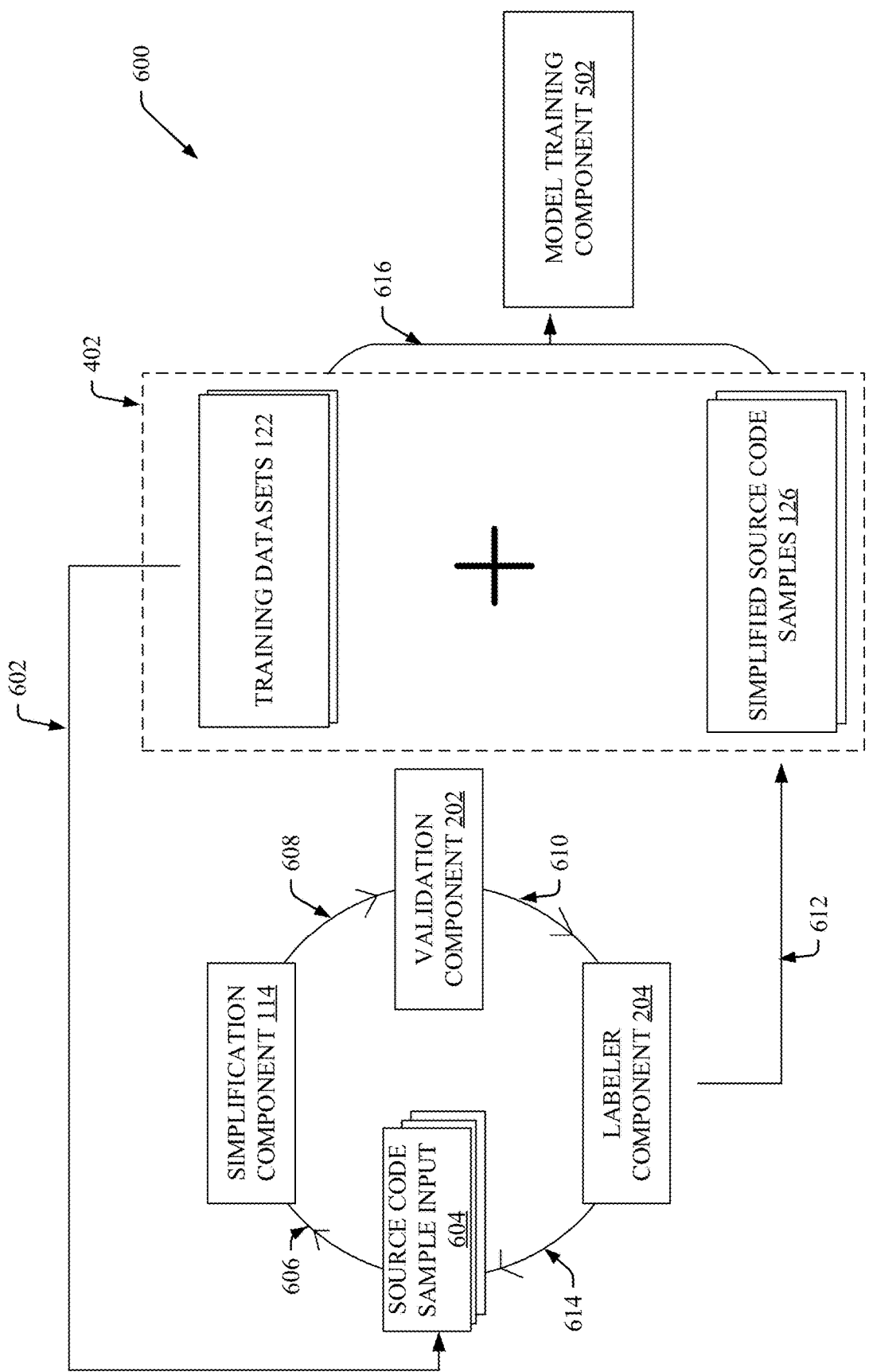
FIG. 6 illustrates a diagram of an example, non-limiting training scheme that can be implemented to training one or more AI models on one or more augmented training datasets in accordance with one or more embodiments described herein.

FIG. 6 illustrates a diagram of an example, non-limiting training scheme 600 that can be performed by the training augmentation component 110 in accordance with one or more embodiments described herein. Repetitive description of like elements employed in other embodiments described herein is omitted for the sake of brevity. Training scheme 600 depicts a combination of features described herein to exemplify operation of the training augmentation component 110; however, the architecture of the training augmentation component 110 is not so limited. For example, training scheme 600 depicts an iterative reduction of source code sample 123; however, a source code sample 123 can be reduced via a single reduction or through multiple reductions that are independent of each other in accordance with one or more embodiments described herein. In another example, the training scheme 600 depicts augmenting the training datasets 122 by combining the training datasets 122 and simplified source code samples 126; however, the training datasets 122 and the simplified source code samples 126 can also be sampled independently from each other in accordance with one or more embodiments described herein.

At 602, the training augmentation component 110 can retrieve one or more source code samples 123 from the one or more training datasets 122 to serve as an initial source code sample input 604 for the one or more subsequent simplification, validation, and/or labelling processes. At 606, the training augmentation component 110 can share a source code sample input 604 with the simplification component 114. In accordance with various embodiments described herein, the simplification component 114 can execute one or more simplification algorithms to reduce the source code sample input 604 into a simplified source code sample 126. At 608, the training augmentation component 110 can share the simplified source code sample 126 with the validation component 202. In accordance with various embodiments described herein, the validation component 202 can verify the correctness of the simplified source code sample 126. For example, the validation component 202 can attempt to compile the simplified source code sample 126; where simplified source code samples 126 that can be compiled are valid, and simplified source code samples 126 that do not compile are invalid.

At 610, where the simplified source code sample 126 is determined to be valid, the training augmentation component 110 can share the valid simplified source code sample 126 with the labeler component 204. In accordance with various embodiments described herein, the labeler component 204 can label the valid simplified source code sample 126 via one or more labeling schemes based on a determination that the valid simplified source code sample 126 maintains the task profile of the source code sample input 604. At 612, the training augmentation component 110 can share the labelled and validated simplified source code sample 126 with the dataset component 402. Also, at 614, the training augmentation component 110 can utilize a copy of the validated and labelled simplified source code sample 126 as the source code sample input 604 for the next iteration of reduction and/or simplified source code sample 126 generation. At 616, the model training component 502 can sample from the one or more training datasets 122 and/or the one or more labelled and/or valid simplified source code samples 126 to train one or more AI models 124.

To demonstrate the efficacy of the various embodiments described herein, the system 100 was employed with regards to a vulnerability detection use-case on a plurality of datasets; however, the various embodiments are appliable to other source code understanding tasks. Example training datasets 122 employed to demonstrate the efficacy of the system 100 include: the s-bAbI synthetic dataset ("s-bAbI"), the Juliet Test Suite ("Juliet"), and the D2A dataset. The s-bAbI, Juliet, and D2A datasets are employed to demonstrate the efficacy of the various embodiments described herein; however, the features of the training augmentation component 110 are not limited to the example s-bAbI, Juliet, and D2A datasets, rather other source code datasets can be analyzed. S-bAbI contains syntactically valid C programs with non-trivial control flow, focusing on the buffer overflow vulnerability. For the purpose of vulnerability detection task, the s-bAbI generator can be used to create a dataset, where samples with the "UNSAFE" tag can be labelled 1 and samples with the "SAFE" tag can be labelled 0. The Juliet dataset contains synthetic examples with different vulnerability types, designed for testing static analyzer. From Juliet test cases, samples tagged as "bad", and with clear bug information as per Juliet's manifest.xml, can be labeled as 1; while samples tagged as "good" can be labelled as 0. The D2A dataset is a real-world vulnerability detection dataset built over multiple Github projects—OpenSSL, FFMpeg, HTTPD, Nginx, and libtiff. The D2A dataset contains in-depth trace level bug information, derived using differential analysis atop the Infer static analyzer outputs of consecutive repository versions, before and after bug-fixing commits. Function level sample extraction from D2A traces can yield training functions labeled as 1 (e.g., from before-fix commits) and 0 (e.g., from after-fix commits). Further, in one or more embodiments, a convolutional neural network ("CNN"), recurrent neural network ("RNN"), and/or graph neural network ("GNN") AI model 124 can be employed to demonstrate the efficacy of the system 100.

Figure 7:
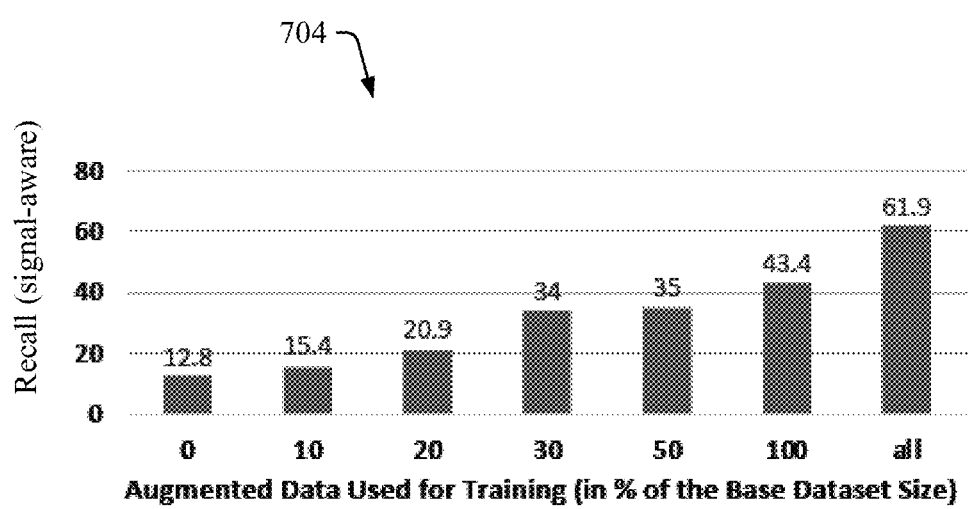
FIGS. 7-8 illustrate diagrams of example, non-limiting graphs that can demonstrate the efficacy of one or more training dataset augmentations in accordance with one or more embodiments described herein.
Figure 8:
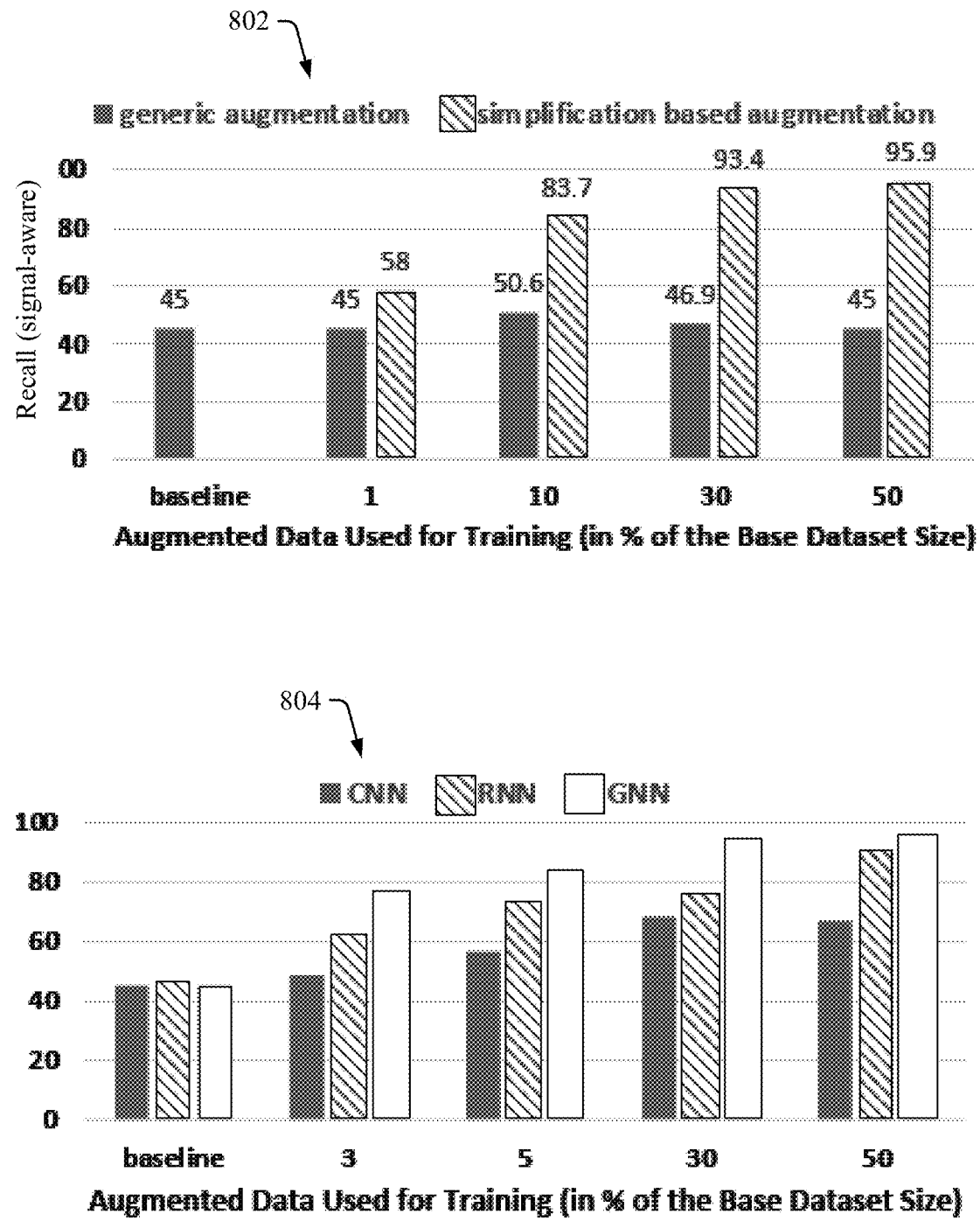

FIGS. 7-8 illustrate diagrams of example, non-limiting graphs 704, 802, and/or 804 that can demonstrate the efficacy of the training augmentation component 110 in accordance with one or more embodiments described herein. Repetitive description of like elements employed in other embodiments described herein is omitted for the sake of brevity. The training augmentation component 110 can generate augmented training datasets 404 comprising, as a factor of the training dataset 122, 9× samples for s-bAbI, 9.6× samples for Juliet, and 53× for D2A. The varying levels of augmentation can be due to the difference in the size of the source code samples 123 comprised within the training datasets 122. For example, the larger the source code sample input 604, the more reduction iterations can be performed by the simplification component 114; thereby resulting in potentially more valid and/or labelled simplified source code samples 126.

As shown in FIG. 7, training the one or more AI models 124 over the more populated augmented training datasets 404 can enhance model performance. For example, graph 704 regards the GNN model 124 trained with random sampling of the augmented Juliet dataset. The signal-aware recall metric can be used to demonstrate improved AI model 124 performance that can be achieved via the training augmentation component 110. The signal aware recall metric can be used to measure the signal awareness of an AI-for-code model. For instance, in the context of a vulnerability detection task, while a recall measurement can measure the proportion of vulnerable samples which the model predicts correctly, the signal-aware recall metric can measure for how many of those cases does the model capture the correct signals to arrive at the prediction. For example, in the context of vulnerability detection, the signal-aware recall metric can measure the proportion of vulnerable samples which the AI model 124 predicts correctly (e.g., using task-relevant signals). The x-axis of graph 704 shows the proportion of samples (e.g., in percentage of the base dataset size) randomly selected from the generated set, and added to the training dataset 122, with the leftmost point (e.g., x=0) referring to the baseline model performance. Additionally, the training augmentation component 110 can improve AI model 124 performance with regards to other evaluation metrics, such as, for example: accuracy, F1 values, average precision (e.g., PR-AUC), a combination thereof, and/or the like. As shown in FIG. 7, gains in model performance can continue with more augmentation. By presenting the AI model 124 with smaller samples, while still containing the characteristics relevant to the task at hand, the AI model 124 can be trained to focus more on task-relevant aspects of the source code samples 123, and less on noise data or dataset nuances.

Graphs 802 and/or 804 exemplify that the enhanced AI model 124 performance achievable by the training augmentation component 110 can be attributed to more than just increasing the sample population. For example, FIG. 8 depicts the signal-aware recall values obtained with generic augmentation compared to the augmentation performed by the training augmentation component 110, for a few representative augmentation levels for the s-bAbI dataset. As shown in FIG. 8, gains in model performance can continue with more augmentation, with signal-aware recall reaching almost 96% of its attainable max with 50% augmentation, amounting to a 113% improvement over training the AI model 124 with just the training dataset 122. Also shown in FIG. 8, generic augmentation to increase the sample population can have little to no effect on the performance of the AI model 124 (e.g., with respect to the signal-aware recall metric). In contrast, augmenting the training dataset 122 to further sample valid and/or labelled simplified source code samples 126 can markedly improve AI model 124 performance. Additionally, as shown in graph 804, the improved performance can be achieved across a wide variety of AI model 124 types.

Figure 9:
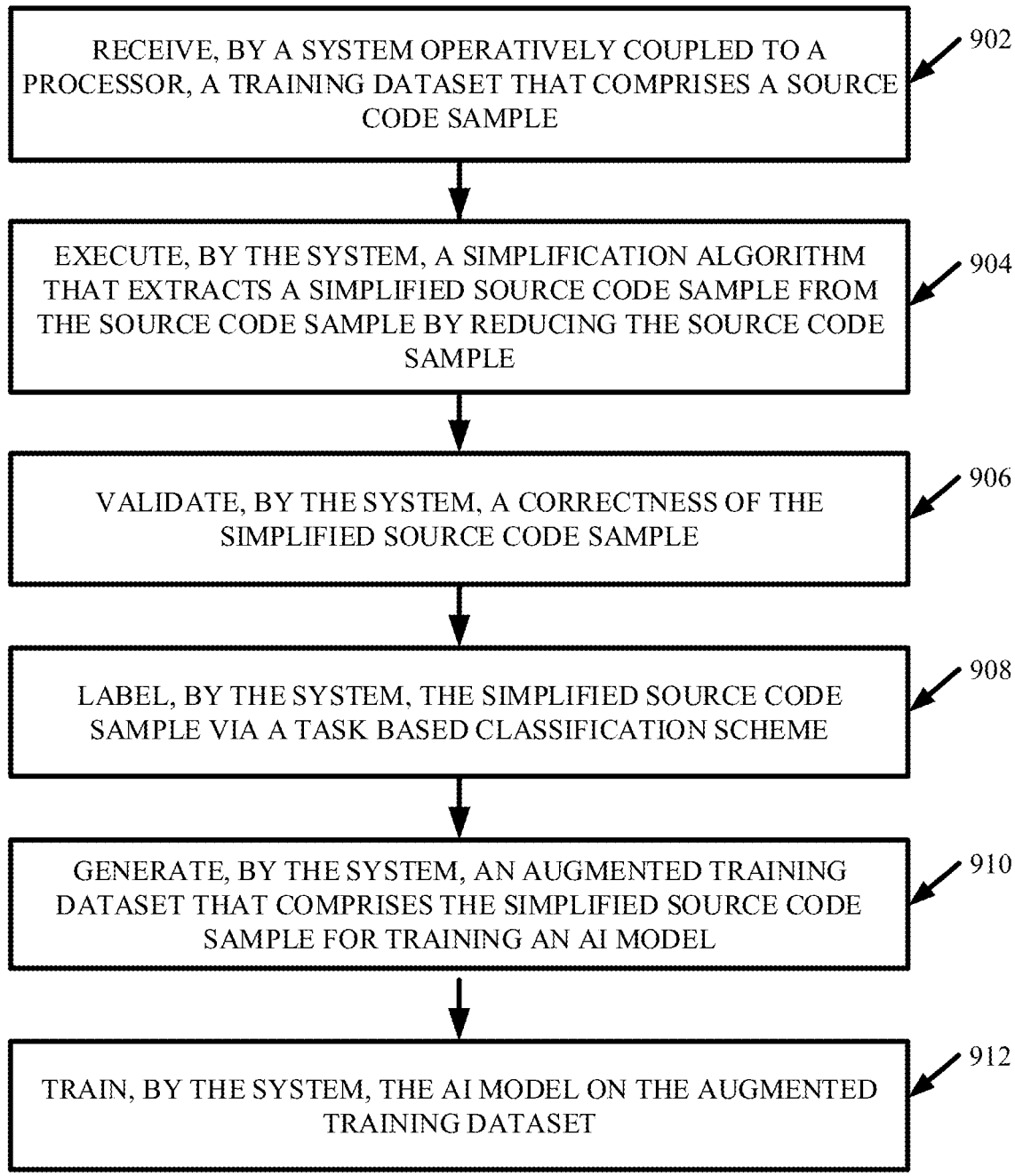
FIG. 9 illustrates a flow diagram of an example, non-limiting computer-implemented method that can facilitate the generation of one or more augmented training datasets and/or the training of one or more AI models on the one or more augmented training datasets in accordance with one or more embodiments described herein.

FIG. 9 illustrates a flow diagram of an example, non-limiting computer-implemented method 900 that can facilitate generating one or more augmented training datasets 404 and/or training one or more AI models 124 on one or more augmented training datasets 404 in accordance with one or more embodiments described herein. Repetitive description of like elements employed in other embodiments described herein is omitted for the sake of brevity.

At 902, the computer-implemented method 900 comprises receiving (e.g., via communications component 112), by a system 100 operatively coupled to a processor 120, one or more training datasets 122 that can comprise one or more source code samples 123. For example, the one or more training datasets 122 can be entered into the system 100 via one or more input devices 106. At 904, the computer-implemented method 900 can execute (e.g., via simplification component 114), by the system 100, one or more simplification algorithms that can generate one or more simplified source code samples 126 by reducing the one or more source code samples 123 of the one or more training datasets 122. For example, the one or more simplified source code samples 126 can be generated by extracting one or more portions from the one or more source code samples 123 of the one or more training datasets 122. In another example, the one or more simplified source code samples 126 can be generated by removing one or more tokens from the one or more source code samples 123 of the one or more training datasets 122. In a further example, the one or more simplified source code samples 126 can be generated via one or more iterative reductions of a source code sample 123 of the one or more training datasets 122 in accordance with various embodiments described herein.

At 906, the computer-implemented method 900 can comprise validating (e.g., via validation component 202), by the system 100, a correctness of the one or more simplified source code samples 126. For example, the validating at 906 can comprise an attempt to compile the one or more simplified source code samples 126. Simplified source code samples 126 that can be compiled can be determined to be correct and/or valid, while simplified source code samples 126 that cannot be compiled can be determined to be incorrect and/or invalid. At 908, the computer-implemented method 900 can comprise labeling (e.g., via labeler component 204), by the system 100, the one or more simplified source code samples 126 via a task based labeling scheme. For example, simplified source code samples 126 that maintain the task profile of the parent source code sample 123 can be labelled to one or more classes, groups, and/or clusters based on a define machine learning task.

At 910, the computer-implemented method 900 can comprise generating (e.g., via dataset component 402), by the system 100, one or more augmented training datasets 404 that can comprise the one or more simplified source code samples 126 for training one or more AI models 124. For example, the generating at 910 can comprise adding the one or more simplified source code samples 126 to the one or more training datasets to generate the one or more augmented training datasets 404. At 912, the computer-implemented method 900 can comprise training (e.g., via model training component 502), by the system 100, the one or more AI models 124 on the one or more augmented training datasets 404.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
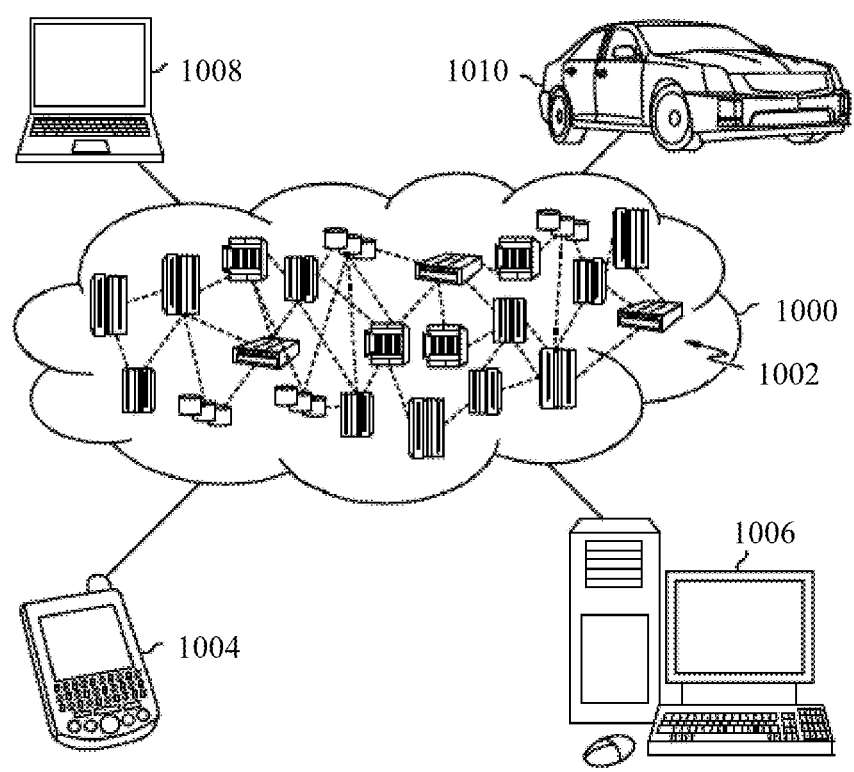
FIG. 10 depicts a cloud computing environment in accordance with one or more embodiments described herein.

Referring now to FIG. 10, illustrative cloud computing environment 1000 is depicted. As shown, cloud computing environment 1000 includes one or more cloud computing nodes 1002 with which local computing devices used by cloud consumers, such as, for example, personal digital assistant (PDA) or cellular telephone 1004, desktop computer 1006, laptop computer 1008, and/or automobile computer system 1010 may communicate. Nodes 1002 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1004-1010 shown in FIG. 10 are intended to be illustrative only and that computing nodes 1002 and cloud computing environment 1000 can communicate with any type of computerized device over any type of network and/or network addressable connection (e.g., using a web browser).

Figure 11:
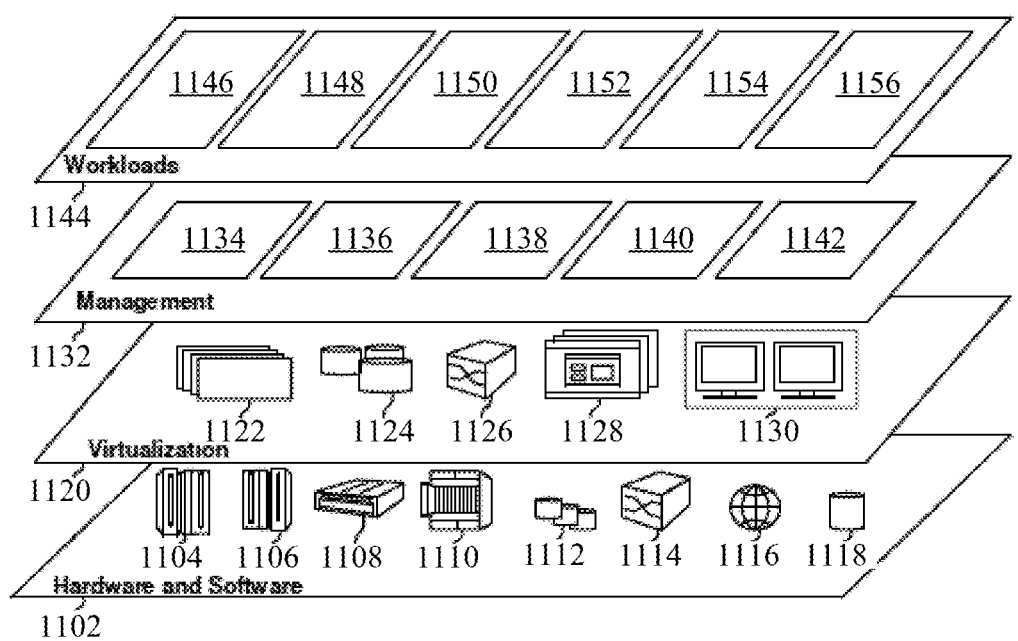
FIG. 11 depicts abstraction model layers in accordance with one or more embodiments described herein.

Referring now to FIG. 11, a set of functional abstraction layers provided by cloud computing environment 1000 (FIG. 10) is shown. Repetitive description of like elements employed in other embodiments described herein is omitted for the sake of brevity. It should be understood in advance that the components, layers, and functions shown in FIG. 11 are intended to be illustrative only and embodiments of the invention are not limited thereto. As depicted, the following layers and corresponding functions are provided.

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and AI model training 1156. Various embodiments of the present invention can utilize the cloud computing environment described with reference to FIGS. 10 and 11 to augment one or more training datasets and/or train one or more AI models.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 12:
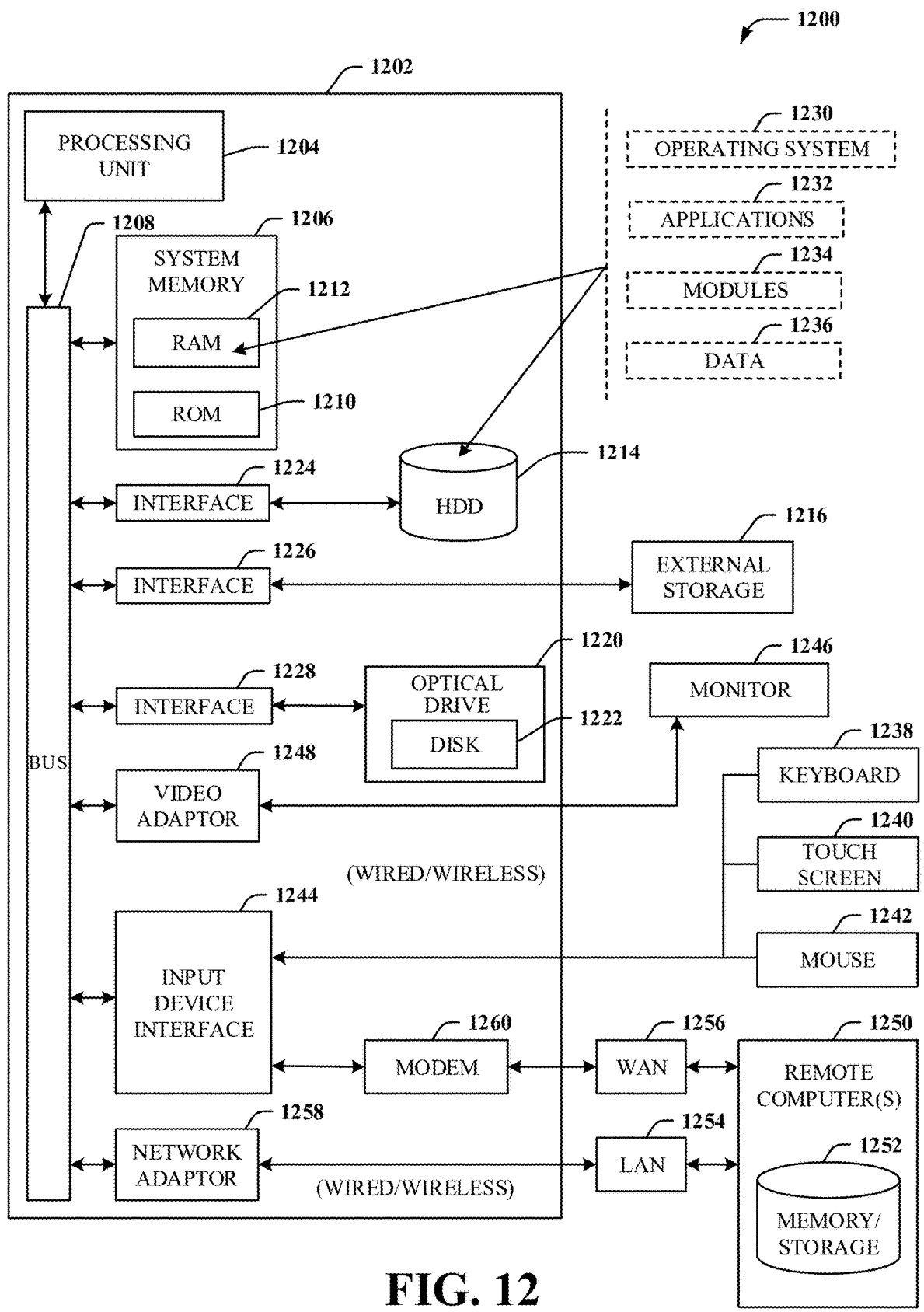
FIG. 12 illustrates a block diagram of an example, non-limiting operating environment in which one or more embodiments described herein can be facilitated.

In order to provide additional context for various embodiments described herein, FIG. 12 and the following discussion are intended to provide a general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, and/or the like, that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things ("IoT") devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory ("RAM"), read only memory ("ROM"), electrically erasable programmable read only memory ("EEPROM"), flash memory or other memory technology, compact disk read only memory ("CD-ROM"), digital versatile disk ("DVD"), Blu-ray disc ("BD") or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system ("BIOS") can be stored in a non-volatile memory such as ROM, erasable programmable read only memory ("EPROM"), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive ("HDD") 1214 (e.g., EIDE, SATA), one or more external storage devices 1216 (e.g., a magnetic floppy disk drive ("FDD") 1216, a memory stick or flash drive reader, a memory card reader, a combination thereof, and/or the like) and an optical disk drive 1220 (e.g., which can read or write from a CD-ROM disc, a DVD, a BD, and/or the like). While the internal HDD 1214 is illustrated as located within the computer 1202, the internal HDD 1214 can also be configured for external use in a suitable chassis (not shown). Additionally, while not shown in environment 1200, a solid state drive ("SSD") could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus ("USB") and Institute of Electrical and Electronics Engineers ("IEEE") 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine ("VM") of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module ("TPM"). For instance with a TPM, boot components hash next in time boot components, and wait for a match of results to secured values, before loading a next boot component. This process can take place at any layer in the code execution stack of computer 1202, e.g., applied at the application execution level or at the operating system ("OS") kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared ("IR") remote control, a radio frequency ("RF") remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, and/or the like.

A monitor 1246 or other type of display device can be also connected to the system bus 1208 via an interface, such as a video adapter 1248. In addition to the monitor 1246, a computer typically includes other peripheral output devices (not shown), such as speakers, printers, a combination thereof, and/or the like.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network ("LAN") 1254 and/or larger networks, e.g., a wide area network ("WAN") 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point ("AP") disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, and/or the like), and telephone. This can include Wireless Fidelity ("Wi-Fi") and BLUETOOTH® wireless technologies. Thus, the communication can be a predefined structure as with a conventional network or simply an ad hoc communication between at least two devices.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor, operably coupled to the memory, and that executes the computer executable components stored in the memory, wherein the computer executable components comprise:
      a simplification component that:
         identifies, from source code samples within a training dataset, a source code sample having a threshold amount of complexity according to a code complexity metric, and
         generates a plurality of simplified source code samples from the source code sample, via series of iterative code reductions of the source code sample, wherein the plurality of simplified source code samples have different amounts of complexity according to the code complexity metric;
      training augmentation component that generates an augmented training dataset for training an artificial intelligence model to incorporate code complexity into the artificial intelligence model, by:
         selecting a simplified source code sample from a subset of the plurality of simplified source code samples that are determined to be correct according to one or more correctness criteria, and have a same task profile as the source code sample according to one or more validation criteria, and
         adding the simplified source code sample to the training dataset to generate the augmented training dataset; and
      a model training component that trains the artificial intelligence model using the augmented training dataset, wherein the training comprises iteratively training the artificial intelligence model by selecting simplified source code samples from the subset of the plurality of simplified source code samples in a progressive order from least code complexity to most code complexity.

2. The system of claim 1, wherein the one or more correctness criteria comprise at least one of: the simplified source code sample is able to be compiled, or the simplified source code sample is able to be executed.

3. The system of claim 1, further comprising:
   a validation component that validates a correctness of the simplified source code sample based on the one or more correctness criteria; and
   a labeler component that labels the simplified source code sample via a task-specific labeling scheme.

4. The system of claim 1, wherein the one or more validation criteria comprise at least one of: the simplified source code sample is free of defects, or the simplified source code sample only has one or more defects that are also present in the source code sample.

5. The system of claim 1, wherein the subset of the plurality of simplified source code samples have less noise data that the source code sample.

6. A system, comprising:
   a memory that stores computer executable components; and
   a processor, operably coupled to the memory, and that executes the computer executable components stored in the memory, wherein the computer executable components comprise:
      a simplification component that:
         identifies, from source code samples within a training dataset, a source code sample having a threshold amount of complexity according to a code complexity metric, and
         generates, using a simplification algorithm, a plurality of simplified source code samples from the source code sample, wherein the simplification algorithm removes one or more portions of the source code sample, and wherein the plurality of simplified source code samples have less complexity than the source code sample according to the code complexity metric; and
      a model training component that trains an artificial intelligence model to incorporate code complexity into the artificial intelligence model, based on an augmented training dataset that comprises the a subset of the plurality of simplified source code samples, wherein the subset of the plurality of simplified source code samples are determined to be correct according to one or more correctness criteria, and wherein the training comprises iteratively training the artificial intelligence model by selecting simplified source code samples from the subset of the plurality of simplified source code samples in a progressive order from least code complexity to most code complexity.

7. The system of claim 6, wherein the one or more correctness criteria comprise at least one of: the simplified source code sample is able to be compiled, or the simplified source code sample is able to be executed.

8. The system of claim 6, wherein the simplification component generates the plurality of simplified source code samples from the source code sample via a series of iterative reductions.

9. The system of claim 6, further comprising:
a validation component that validates a correctness of a simplified source code sample based on the one or more correctness criteria;
a labeler component that labels the simplified source code sample via a task based labeling scheme; and
a dataset component that generates the augmented training dataset by adding the simplified source code sample to the training dataset, subsequent to validation by the validation component and labeling by the labeler component, to generate the augmented training dataset.

10. A computer-implemented method, comprising:
identifying, by a system operatively coupled to a processor, from source code samples within a training dataset, a source code sample having a threshold amount of complexity according to a code complexity metric;
generating, by the system, a plurality of simplified source code samples from the source code sample, via series of iterative code reductions of the source code sample, wherein the plurality of simplified source code samples have different amounts of complexity according to the code complexity metric;
generating, by the system, an augmented training dataset for training an artificial intelligence model to incorporate code complexity into the artificial intelligence model, by:
selecting a simplified source code sample from a subset of the plurality of simplified source code samples that are determined to be correct according to one or more correctness criteria, and have a same task profile as the source code sample according to one or more validation criteria, and
adding the simplified source code sample to the training dataset to generate the augmented training dataset; and
training, by the system, the artificial intelligence model using the augmented training dataset, wherein the training comprises iteratively training the artificial intelligence model by selecting simplified source code samples from the subset of the plurality of simplified source code samples in a progressive order from least code complexity to most code complexity.

11. The computer-implemented method of claim 10, wherein the one or more correctness criteria comprise at least one of: the simplified source code sample is able to be compiled, or the simplified source code sample is able to be executed.

12. The computer-implemented method of claim 10, further comprising:
employing, by the system, a Delta Debugging algorithm to perform the series of iterative reductions.

13. The computer-implemented method of claim 10, wherein the one or more validation criteria comprise at least one of: the simplified source code sample is free of defects, or the simplified source code sample only has one or more defects that are also present in the source code sample.

14. The computer-implemented method of claim 10, further comprising:
validating, by the system, a correctness of the simplified source code sample based on the one or more correctness criteria; and
labeling, by the system, the simplified source code sample via a task-specific labeling scheme.

15. The computer-implemented method of claim 10, wherein the subset of the plurality of simplified source code samples have less noise data that the source code sample.

16. A computer-implemented method, comprising:
identifying, by a system operatively coupled to a processor, from source code samples within a training dataset, a source code sample having a threshold amount of complexity according to a code complexity metric;
generating, by a system operatively coupled to a processor, using a simplification algorithm, a plurality of simplified source code samples from the source code sample, wherein the simplification algorithm removes one or more portions of the source code sample, and wherein the plurality of simplified source code samples have less complexity than the source code sample according to the code complexity metric; and
training, by the system, an artificial intelligence model to incorporate code complexity into the artificial intelligence model, based on an augmented training dataset that comprises a subset of the plurality of simplified source code samples, wherein the subset of the plurality of simplified source code sample is determined to be correct according to one or more correctness criteria, and wherein the training comprises iteratively training the artificial intelligence model by selecting simplified source code samples from the subset of the plurality of simplified source code samples in a progressive order from least code complexity to most code complexity.

17. The computer-implemented method of claim 16, wherein the one or more correctness criteria comprise at least one of: the simplified source code sample is able to be compiled, or the simplified source code sample is able to be executed.

18. The computer-implemented method of claim 16, further comprising:
generating, by the system, the plurality of source code samples by performing a series of iterative reductions, wherein iterations of the series of iterative reductions generate a new simplified source code sample that is simpler than a previous simplified source code sample generated by the series of iterative reductions, and wherein the plurality of simplified source code samples have different amounts of complexity according to the code complexity metric.

19. The computer-implemented method of claim 16, further comprising:
validating, by the system, a correctness of a simplified source code sample based on the one or more correctness criteria;
labeling, by the system, the simplified source code sample via a task based labeling scheme; and
adding, by the system, the simplified source code sample to the training dataset, subsequent to the validating and labeling, to generate the augmented training dataset.

20. A computer program product for training an artificial intelligence model, the computer program product comprising a computer readable storage medium having program instructions embodied therewith, the program instructions executable by a processor to cause the processor to:
identify, by the processor, from source code samples within a training dataset, a source code sample having a threshold amount of complexity according to a code complexity metric;

generate, by the processor, a plurality of simplified source code samples from the source code sample, via series of iterative code reductions of the source code sample, wherein the plurality of simplified source code samples have different amounts of complexity according to the code complexity metric;

generate, by the processor, an augmented training dataset for training the artificial intelligence model to incorporate code complexity into the artificial intelligence model, by:

selecting a simplified source code sample from a subset of the plurality of simplified source code samples that are determined to be correct according to one or more correctness criteria, and have a same task profile as the source code sample according to one or more validation criteria, and adding the simplified source code sample to the training dataset to generate the augmented training dataset; and train, by the processor, the artificial intelligence model using the augmented training dataset, wherein the training comprises iteratively training the artificial intelligence model by selecting simplified source code samples from the subset of the plurality of simplified source code samples in a progressive order from least code complexity to most code complexity.

21. The computer program product of claim 20, wherein the one or more correctness criteria comprise at least one of: the simplified source code sample is able to be compiled, or the simplified source code sample is able to be executed.

22. The computer program product of claim 20, wherein the one or more validation criteria comprise at least one of: the simplified source code sample is free of defects, or the simplified source code sample only has one or more defects that are also present in the source code sample.

23. The computer program product of claim 20, wherein the program instructions cause the processor to:

employ, by the processor, a Delta Debugging algorithm to perform the series of iterative reductions.

24. The computer program product of claim 20, wherein the program instructions further cause the processor to:

validate, by the processor, a correctness of the simplified source code sample based on the one or more correctness criteria; and label, by the processor, the simplified source code sample via a task based labeling scheme.

25. The computer program product of claim 20, wherein the subset of the plurality of simplified source code samples have less noise data that the source code sample.

\* \* \* \* \*